(12) United States Patent
Furuhashi et al.

(10) Patent No.: US 8,134,639 B2
(45) Date of Patent: Mar. 13, 2012

(54) IMAGING DEVICE AND EXTENDABLE SHOULDER PAD THEREFOR

(75) Inventors: Akihiro Furuhashi, Shizuoka (JP); Tetsuro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 12/408,371

(22) Filed: Mar. 20, 2009

(65) Prior Publication Data

US 2009/0256956 A1 Oct. 15, 2009

(30) Foreign Application Priority Data

Apr. 9, 2008 (JP) ................................. 2008-101974

(51) Int. Cl.
*H04N 5/225* (2006.01)
*G03B 17/00* (2006.01)

(52) U.S. Cl. ........................................ 348/375; 396/420

(58) Field of Classification Search ................ None
See application file for complete search history.

(56) References Cited

U.S. PATENT DOCUMENTS

| 4,091,975 A | * | 5/1978 | Russell, Jr. ..................... 224/265 |
| 4,244,500 A | * | 1/1981 | Fournier ........................ 224/265 |
| 4,389,675 A | * | 6/1983 | Suzuki et al. .................. 348/376 |
| 4,407,437 A | * | 10/1983 | Takubo .......................... 224/270 |
| 4,967,278 A | * | 10/1990 | Greenbaum .............. 348/333.04 |
| 5,073,788 A | * | 12/1991 | Lingwall ........................ 396/425 |
| 5,787,317 A | * | 7/1998 | Robinson, Sr. ................ 396/420 |
| 6,641,010 B2 | * | 11/2003 | Greene .......................... 224/265 |

FOREIGN PATENT DOCUMENTS

| CN | 101557467 A | * | 10/2009 |
| JP | 58-113036 | | 8/1983 |
| JP | 58-115736 | | 8/1983 |
| JP | 59-114542 | | 8/1984 |
| JP | 59-166564 | | 11/1984 |
| JP | 2-215281 | | 8/1990 |
| JP | 2003-259180 | | 9/2003 |
| JP | 2005-210677 | | 8/2005 |
| JP | 2009251475 A | * | 10/2009 |
| WO | WO 97/08888 | | 3/1997 |

* cited by examiner

*Primary Examiner* — Justin P Misleh

(74) *Attorney, Agent, or Firm* — Oblon, Spivak, McClelland, Maier & Neustadt, L.L.P.

(57) ABSTRACT

There is provided an imaging device including a main body having a front part and a rear part; and a lens mounted to the front part of the main body. The main body includes a slope formed in the rear part, the slope being inclined upward with respect to a bottom surface of the rear part and continuous with the bottom surface of the rear part.

8 Claims, 27 Drawing Sheets

IMAGING DEVICE AND EXTENDABLE SHOULDER PAD THEREFOR

BACKGROUND OF THE INVENTION

1. Field of the Invention

The present invention relates to an imaging device including a shoulder pad suppressing an attitude change by a self-weight of the imaging device during photographing, and to the shoulder pad.

2. Description of the Related Art

Japanese Unexamined Patent Application Publication No. 2-215281 discloses an example of such an imaging device of the related art. Japanese Unexamined Patent Application Publication No. 2-215281 discloses a camera support apparatus for which the patent applicant has previously filed a patent application. The camera support apparatus according to Japanese Unexamined Patent Application Publication No. 2-215281 includes: a shoulder pad attached to a bottom of a camera main body; and a breast pad rotatably attached to the shoulder pad through an arm. The camera support apparatus further includes a recess provided in part of the shoulder pad, in which the breast pad may be stored by rotation of the arm.

According to the camera support apparatus having such a configuration (hereinafter referred to as a first related art example), it is expected that a camera may be easily operated by storing the breast pad so as not to cause disturbance and carrying the camera over the shoulder using the shoulder pad during photographing with a lens directed obliquely downward, for example.

Japanese Unexamined Utility Model Application Publication No. 59-114542 discloses a second example of an imaging device of the related art. Japanese Unexamined Utility Model Application Publication No. 59-114542 discloses a video camera including a shoulder rest movable according to a state of use. In the video camera according to Japanese Unexamined Utility Model Application Publication No. 59-114542, a shoulder rest having a support leg is attached to a bottom of a main body so as to be movable backward and forward.

According to the video camera having such a configuration (hereinafter referred to as a second related art example), a video camera main body may be put on the shoulder with the shoulder rest moved near the center of gravity of the camera main body, so that it is expected that stability is improved, burden on the hands is reduced, and an operation may be smoothly performed during photographing, for example.

Japanese Unexamined Utility Model Application Publication No. 59-166564 discloses a third example of an imaging device of the related art. Japanese Unexamined Utility Model Application Publication No. 59-166564 discloses a video tape recorder on which a video camera may be integrally or detachably mounted. In the video tape recorder according to Japanese Unexamined Utility Model Application Publication No. 59-166564, a storage part is provided on a bottom of a video tape recorder enclosure, and a shoulder rest member is attached so as to be horizontally rotatable around a shaft attached near a rear part of the storage part, making it possible to store the shoulder rest member.

According to the video tape recorder having such a configuration (hereinafter referred to as a third related art example), it is expected that disturbance does not occur during non-use, and the shoulder rest member is appropriately withdrawn from the video tape recorder to prevent falling of the video tape recorder and to be used as a shoulder rest in video camera photographing, for example.

SUMMARY OF THE INVENTION

However, a shoulder pad according to an imaging device of the related art in the first and second related art examples is put on the shoulder of the user. Therefore, the shoulder pad is large and the whole device is increased in size, disadvantageously. The shoulder rest member in the third related art example is formed by a U-shaped bar-like member. Therefore, the shoulder rest member is wide and the whole device is also increased in size, disadvantageously.

The present inventors have recognized that in an imaging device of the related art, a shoulder pad is large and the whole imaging device is increased in size.

According to an embodiment of the present invention, an imaging device includes a main body having a front part and a rear part, and a lens mounted to the front part of the main body. The main body includes a slope formed in the rear part, the slope being inclined upward with respect to a bottom surface of the rear part and continuous with the bottom surface of the rear part. A shoulder rest may be provided to the slope of the main body.

An imaging device is realized with a relatively simple configuration by including, in a rear part of a main body, a slope inclined upward with respect to a bottom surface of the rear part of the main body.

BRIEF DESCRIPTION OF THE DRAWINGS

FIG. 9 shows an attitude adjusting mechanism of a video camera according to a first example of an imaging device according to an embodiment of the present invention, where

FIG. 10 shows an attitude adjusting mechanism of a video camera according to a first example of an imaging device according to an embodiment of the present invention, where

FIG. 12 cross-sectionally shows a main part of an attitude adjusting mechanism of a video camera according to a first example of an imaging device according to an embodiment of the present invention, where

FIG. 22 shows an example of cross-sectional shapes of a shaft-shaped member and a sheath-shaped member of a shoulder pad of a video camera according to a first example of an imaging device according to an embodiment of the present invention, where

FIG. 25 shows a main part of a lower support bracket of a cheek pad of a video camera according to a first example of an imaging device according to an embodiment of the present invention, where

DESCRIPTION OF THE PREFERRED EMBODIMENTS

Figure 1:
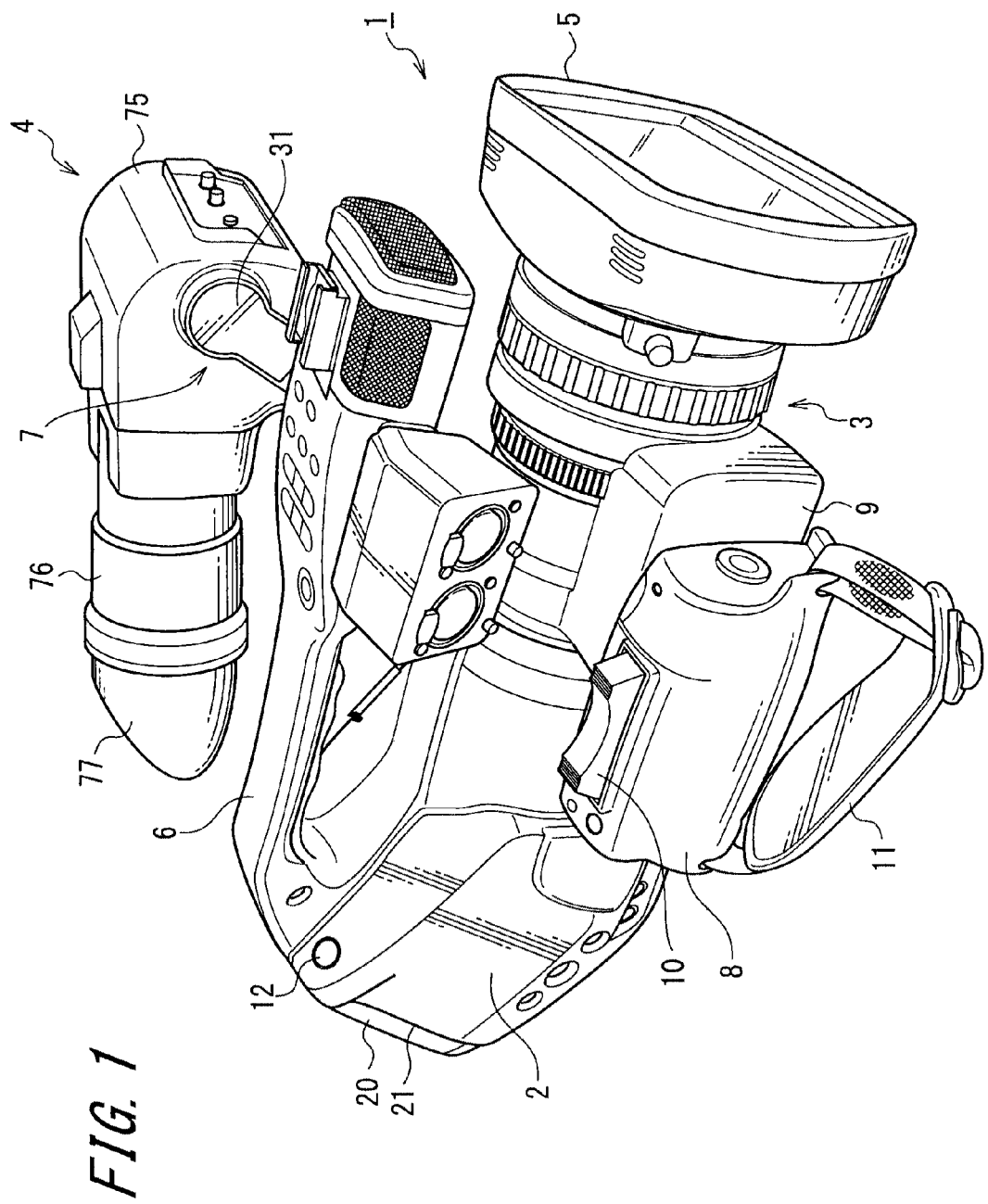
FIG. 1 is an appearance perspective view of a whole configuration of a video camera showing a first example of an imaging device according to an embodiment of the present invention.
Figure 2:
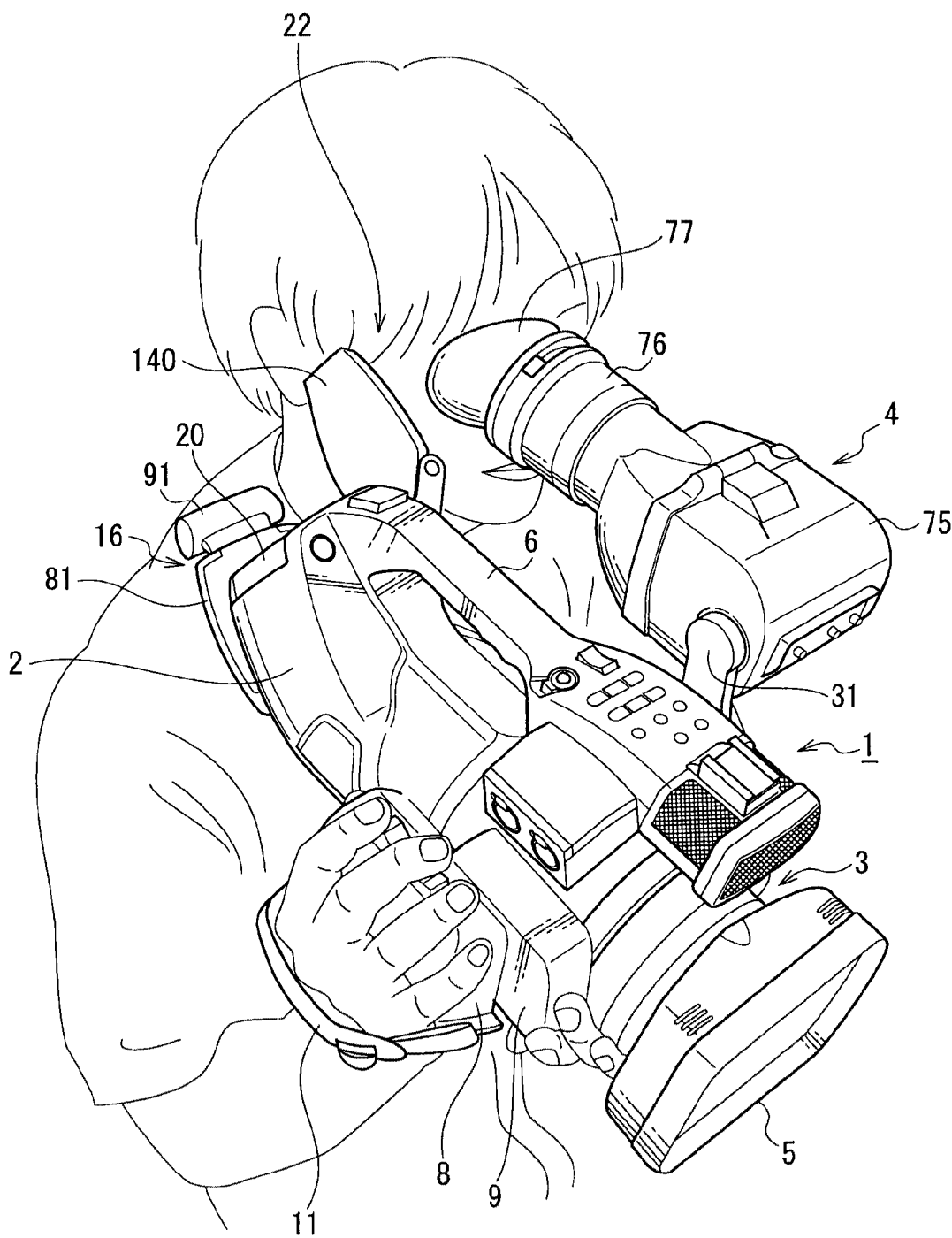
FIG. 2 is a view describing a state of use of a video camera showing a first example of an imaging device according to an embodiment of the present invention.
Figure 3:
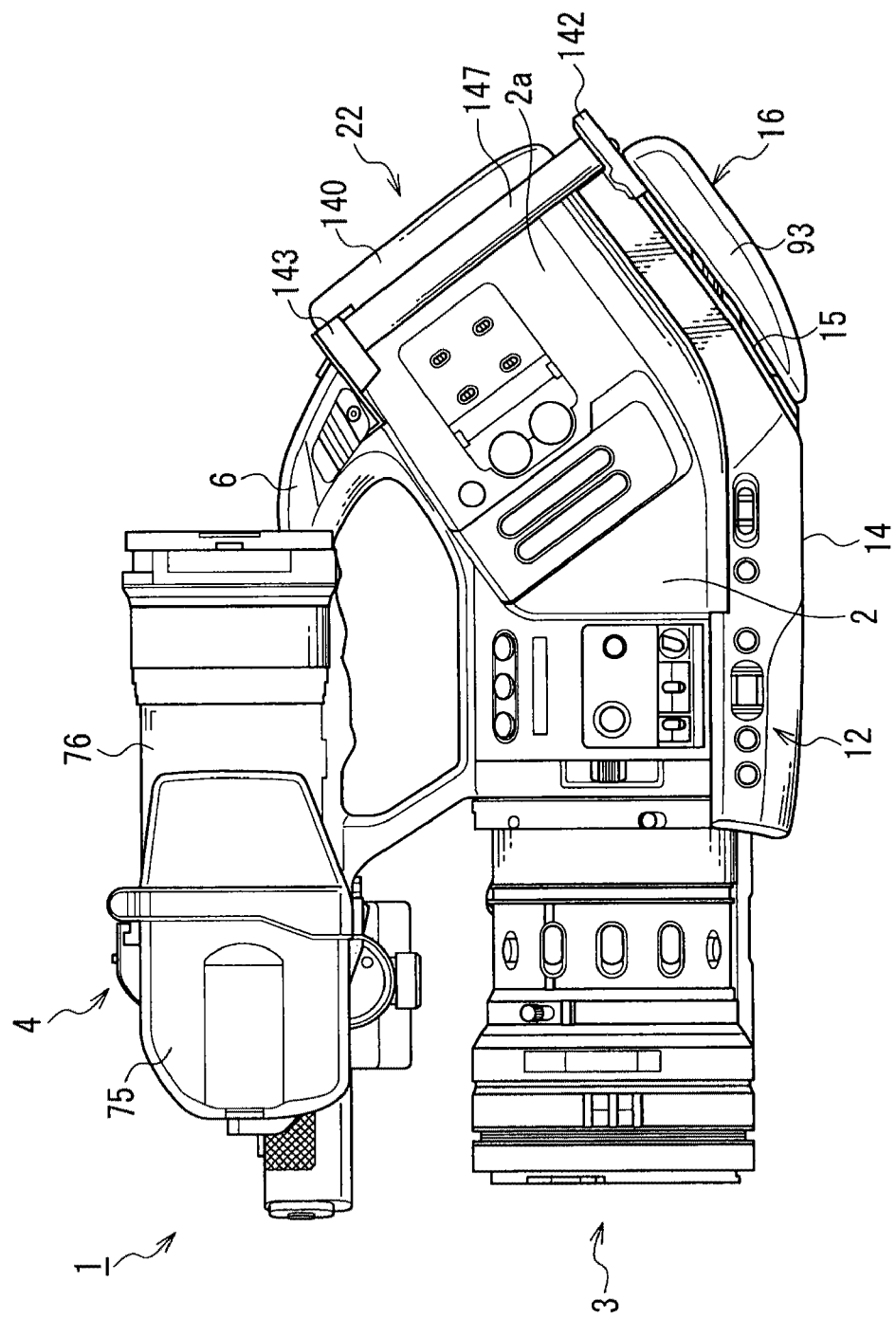
FIG. 3 is a side view of a video camera showing a first example of an imaging device according to an embodiment of the present invention.
Figure 4:
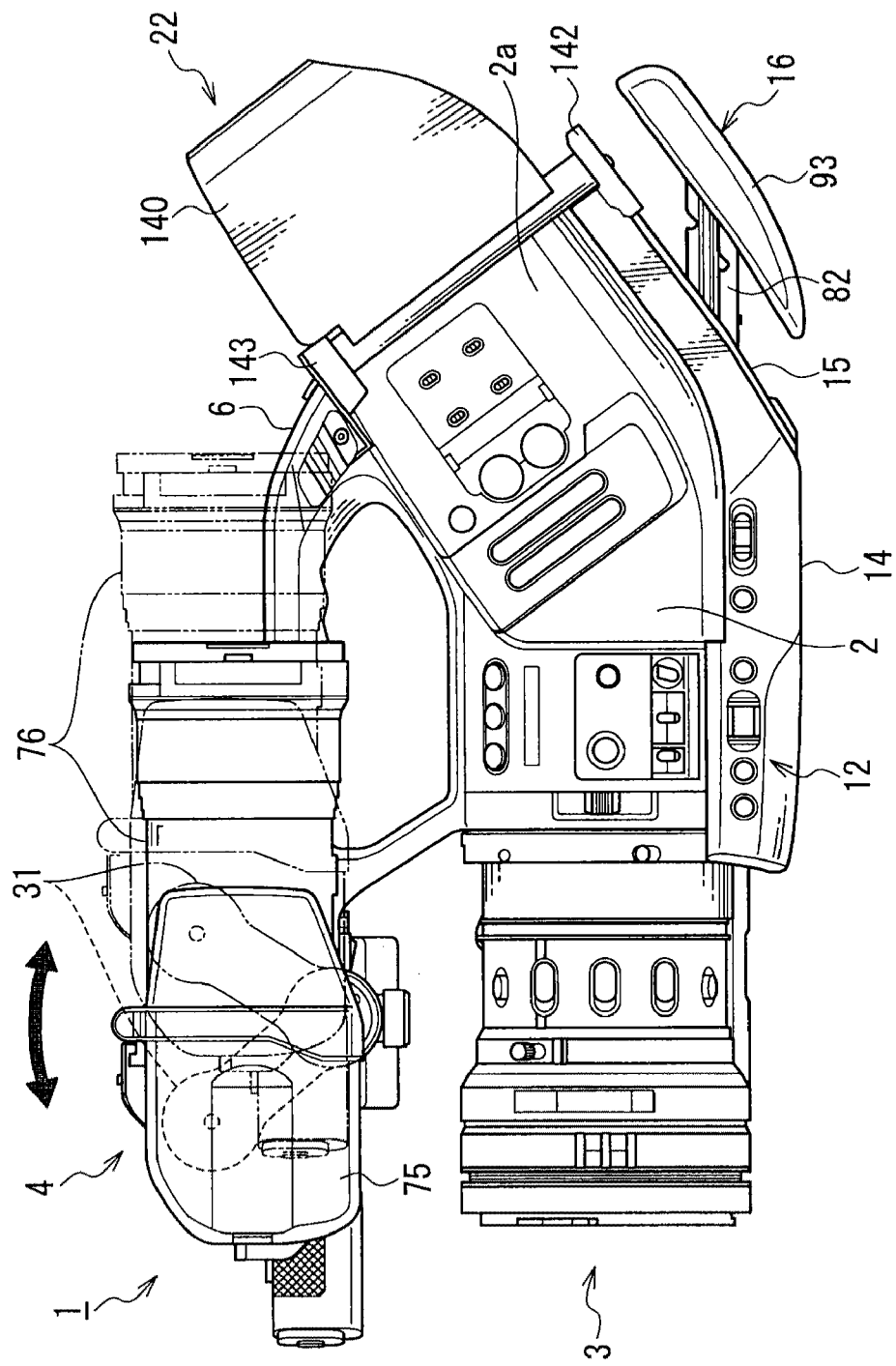
FIG. 4 is a side view describing a state of operation of a video camera showing a first example of an imaging device according to an embodiment of the present invention.
Figure 5:
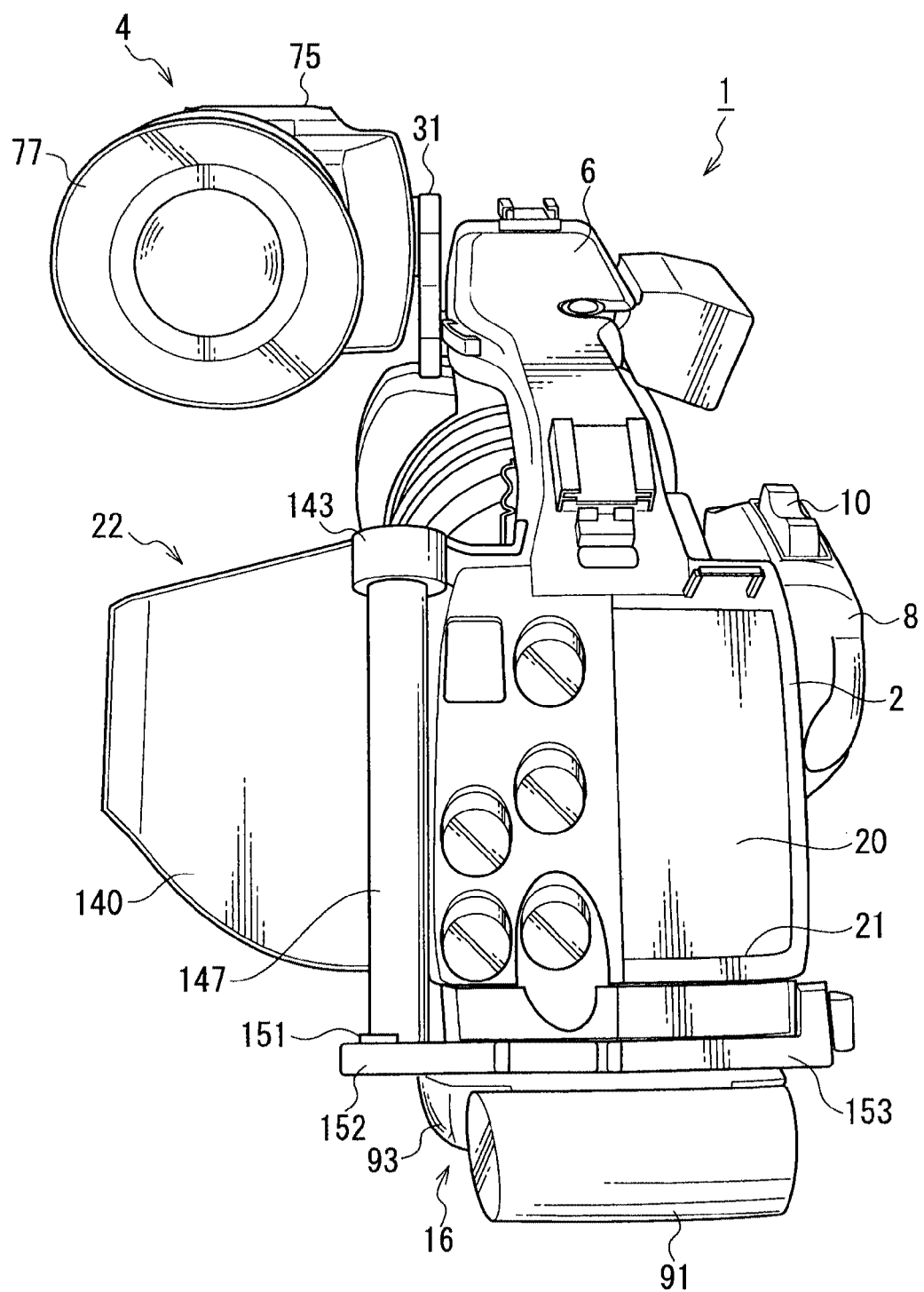
FIG. 5 is a rear view of a video camera showing a first example of an imaging device according to an embodiment of the present invention.

FIGS. 1 to 5 show an example of an imaging device according to an embodiment of the present invention. Specifically, FIG. 1 is an appearance perspective view of a video camera showing a first example of an imaging device according to an embodiment of the present invention. FIG. 2 is a view describing a state of use of the video camera shown in FIG. 1. FIGS. 3 and 4 are side views of the video camera. FIG. 5 is a rear view of the same video camera.

A video camera 1 shown in FIGS. 1 to 5 is a digital video camera using a semiconductor recording medium as an information recording medium. The video camera 1 converts an optical image of an object input from a lens device to an electric signal using an imaging element, and records the image on a built-in semiconductor recording medium or an outside semiconductor recording medium or displays the image on a display such as a viewfinder. Examples of the imaging element include CCD and CMOS image sensors. A liquid crystal display, an organic EL display, or the like, not shown, may be provided as a display and used in combination with the viewfinder.

The video camera 1 shown in this example may be used for any business or household application. An imaging device according to an embodiment of the present invention is not limited to the digital video camera of this example, and may be applied not only to an analog video camera, obviously, but also to other imaging devices such as a television camera, a still camera, and a monitor camera. An information recording medium is not limited to the semiconductor recording medium shown in this example. Specifically, it is possible to use a disk-shaped recording medium, e.g., a recordable optical disk such as a DVD or CD-ROM, a magneto-optical disk, or a magnetic disk, a tape-shaped recording medium such as a tape cassette, etc.

The video camera 1 includes a camera main body 2, a lens device 3, the aforementioned imaging element (not shown), and an electronic viewfinder 4 showing a specific example of a viewfinder. The camera main body 2 shows a specific example of an imaging device main body and is formed by a hollow enclosure with a front surface opened. A control unit (not shown) is built in the camera main body 2, and the control unit controls driving of devices and mechanisms such as the lens device 3 and the imaging element (not shown), so that a predetermined operation is performed. The front surface of the camera main body 2 has a junction to detachably attach the lens device 3, and the imaging element (not shown) is placed in an approximate center of the junction. A light-receiving surface of the imaging element is directed to an object, and an optical axis of the lens device 3 mounted on the camera main body 2 approximately agrees with an approximate center of the light-receiving surface.

The lens device 3 has: a plurality of lens barrels; an imaging lens formed by a combination of a plurality of lenses; and a lens driving part moving a predetermined lens barrel along the optical axis. The plurality of lens barrels may be relatively rotated and/or moved along the optical axis, and the plurality of lenses are attached to the plurality of lens barrels. A predetermined lens barrel is rotated or moved along the optical axis by actuation of the lens driving part to adjust the imaging lens, and thereby autofocusing, zooming, and the like may be performed. A lens hood 5 regulating light incident to the imaging lens is detachably attached to a front part of the lens device 3.

A handle 6 is attached to an upper part of the camera main body 2, which extends in a longitudinal direction that is a direction of the optical axis of the lens device 3. The electronic viewfinder 4 is supported by a front part of the handle 6 through an attitude adjusting mechanism 7 attitude adjustably and position adjustably. The handle 6 and the attitude adjusting mechanism 7 will be described later in detail.

A holding part 8 to hold the camera main body 2 is provided on one side surface of the camera main body (right side surface in this example). The holding part 8 is fixed to a side surface of a holding table 9 provided on the camera main body 2 to protrude laterally, and has a size and a shape convenient for holding it with one hand. A zoom button 10 to zoom the lens device 3 is provided in an approximate center on an upper surface of the holding part 8. Further, a protection band 11 is attached to the holding part 8 to support the hand of the user gripping the holding part 8 and prevent dropping of the camera main body 2.

As shown in FIGS. 3 and 4, many operation buttons 12 to operate the video camera 1 are provided on the other side surface of the camera main body 2 (left side surface in this example). Although the operation buttons 12 are also placed on the right side surface of the camera main body 2, the operation buttons on the right side surface are not as many as the operation buttons on the left side surface, since the right hand of the user is exclusively used for holding the camera main body 2. Examples of the operation buttons include various function buttons such as a power button, a recording button, a playback button, a fast-forward button, a rewind button, and a shutter button.

A rear part 2a of the camera main body 2 is inclined upward, which is opposite to a front part of the camera main body 2 on which the lens device 3 is mounted. Specifically, a bottom surface 14 of the camera main body 2 is formed almost horizontally, and a lower slope 15 is bent upward from a rear part of the bottom surface 14 to reach a back surface of the camera main body 2. The lower slope 15 forms a shoulder rest of the video camera 1. Although the shoulder rest 15 may be the lower slope 15 of the camera main body 2 as is, the shoulder rest 15 is formed in this example using a shoulder pad 16 attached to the camera main body 2 to be movable forward and backward. The shoulder rest 15 will be described later in detail.

Further, as shown in FIG. 5, the back surface of the camera main body 2 has an upper slope 17 continuous with an upper part of the lower slope 15 and inclined to turn forward. A side of the upper slope facing the holding part 8 has a battery storage part 21 on which a power battery 20 is detachably mounted. A cheek pad 22 is rotatably attached to a side of the back surface of the camera main body 2 opposite to the battery storage part 21. The cheek pad 22 will be described later in detail.

Figure 6:
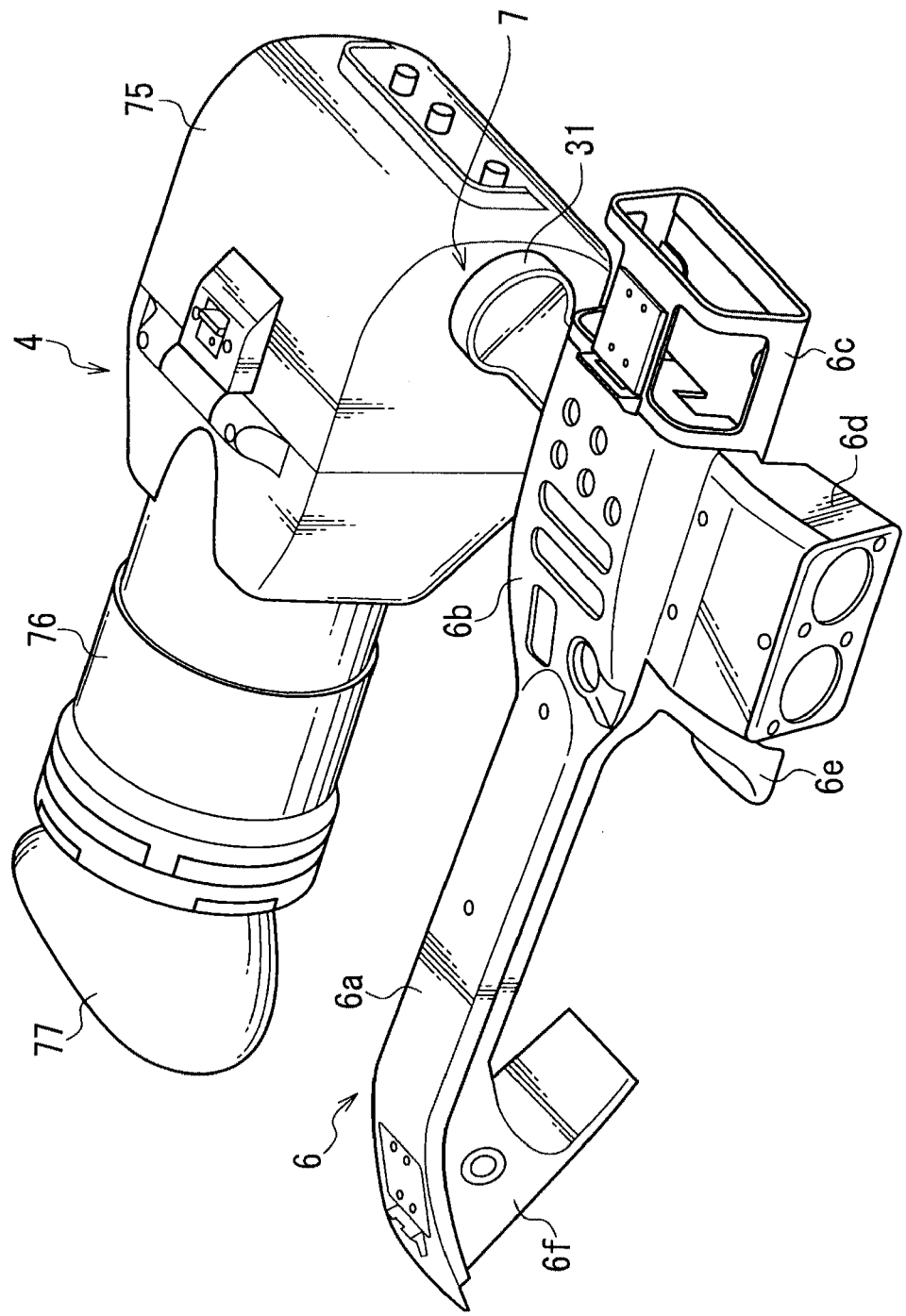
FIG. 6 is a front oblique view describing a handle and an electronic viewfinder according to a video camera showing a first example of an imaging device according to an embodiment of the present invention.
Figure 7:
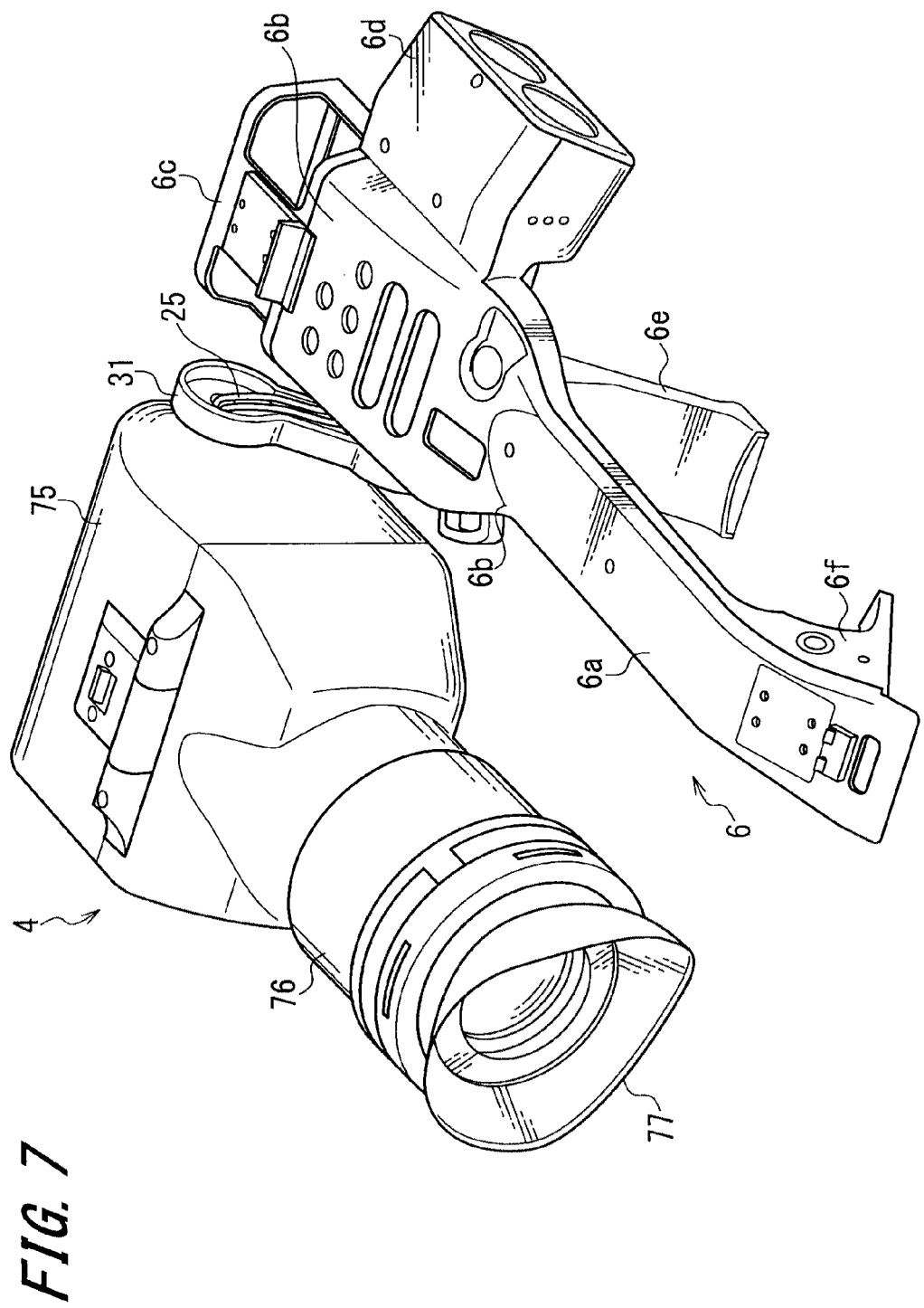
FIG. 7 is a rear oblique view describing a handle and an electronic viewfinder according to a video camera showing a first example of an imaging device according to an embodiment of the present invention.
Figure 8:
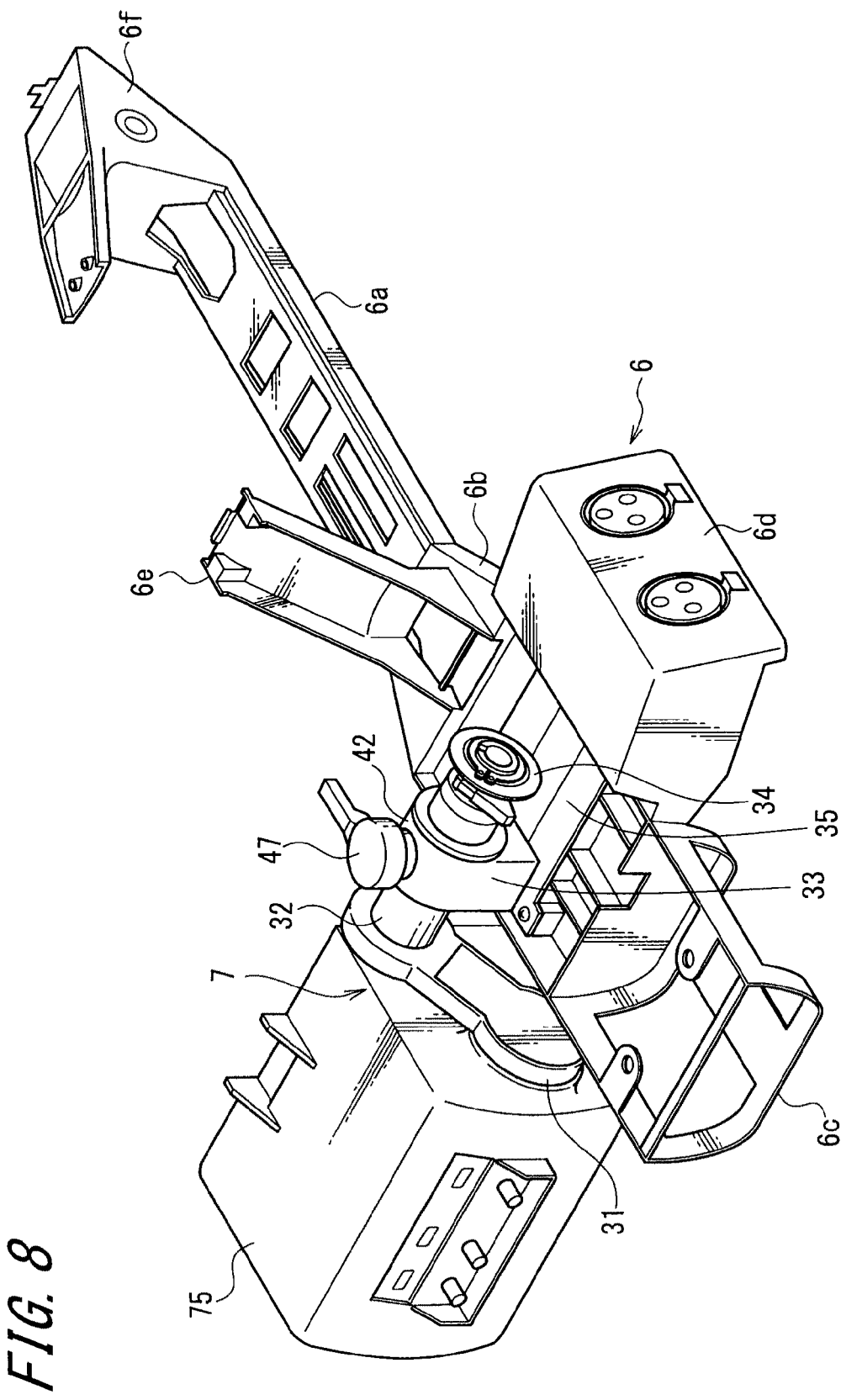
FIG. 8 is a front oblique view describing a bottom of a handle and an electronic viewfinder according to a video camera showing a first example of an imaging device according to an embodiment of the present invention.

FIG. 6 is a top front oblique view describing the handle 6 and the electronic viewfinder 4. FIG. 7 is a top rear oblique view describing the handle 6 and the electronic viewfinder 4. FIG. 8 is a bottom front oblique view describing the handle 6 and the electronic viewfinder 4.

As shown in FIGS. 6 to 8, the handle 6 has: a gripping part 6a; a bearing storage part 6b continuous with a front part of the gripping part 6a; a microphone storage part 6c; a terminal storage part 6d; and a front leg 6e and a rear leg 6f provided to protrude downward from both edges of the gripping part 6a. The gripping part 6a of the handle 6 is formed by a bar-shaped part having a size and a length convenient for gripping by the user. The bearing storage part 6b is continuous with a front side of the gripping part 6a, and the microphone storage part 6c is continuous with a front side of the bearing storage part 6b. The terminal storage part 6d is laterally continuous with the bearing housing part 6b. The bearing storage part 6b, the microphone storage part 6c, and the terminal storage part 6d have hollow spaces, respectively.

The bearing storage part 6b stores a bearing of the attitude adjusting mechanism 7 and a wiring board on which various operation buttons (not shown) are mounted, and the various operation buttons are exposed from predetermined holes. Further, a microphone (not shown) is built in the microphone storage part 6c. The microphone storage part 6c has a front surface opening, left side and right side surface openings, and a bottom surface opening, and the openings are covered with a net material through which a sound wave may pass. The terminal storage part 6d stores a connection terminal for electric connection to another electronic equipment (such as a television receiver, a DVD recorder, or an image editing apparatus) (see FIG. 1).

The handle 6 is fixed to the camera main body 2 by screwing the front leg 6e and the rear leg 6f. The attitude adjusting mechanism 7 attached to the handle 6 has a configuration as shown in FIG. 8. Specifically, the attitude adjusting mechanism 7 has an arm 31, a slide shaft 32, a bearing 33, and a loading part 34. The electronic viewfinder 4 is attached to the arm 31, and the slide shaft 32 is provided integrally with the arm 31. The slide shaft 32 is supported by the bearing 33, and the loading part 34 applies a predetermined load between the slide shaft 32 and the bearing 33 to provide the slide shaft 32 with predetermined frictional resistance.

Figure 14:
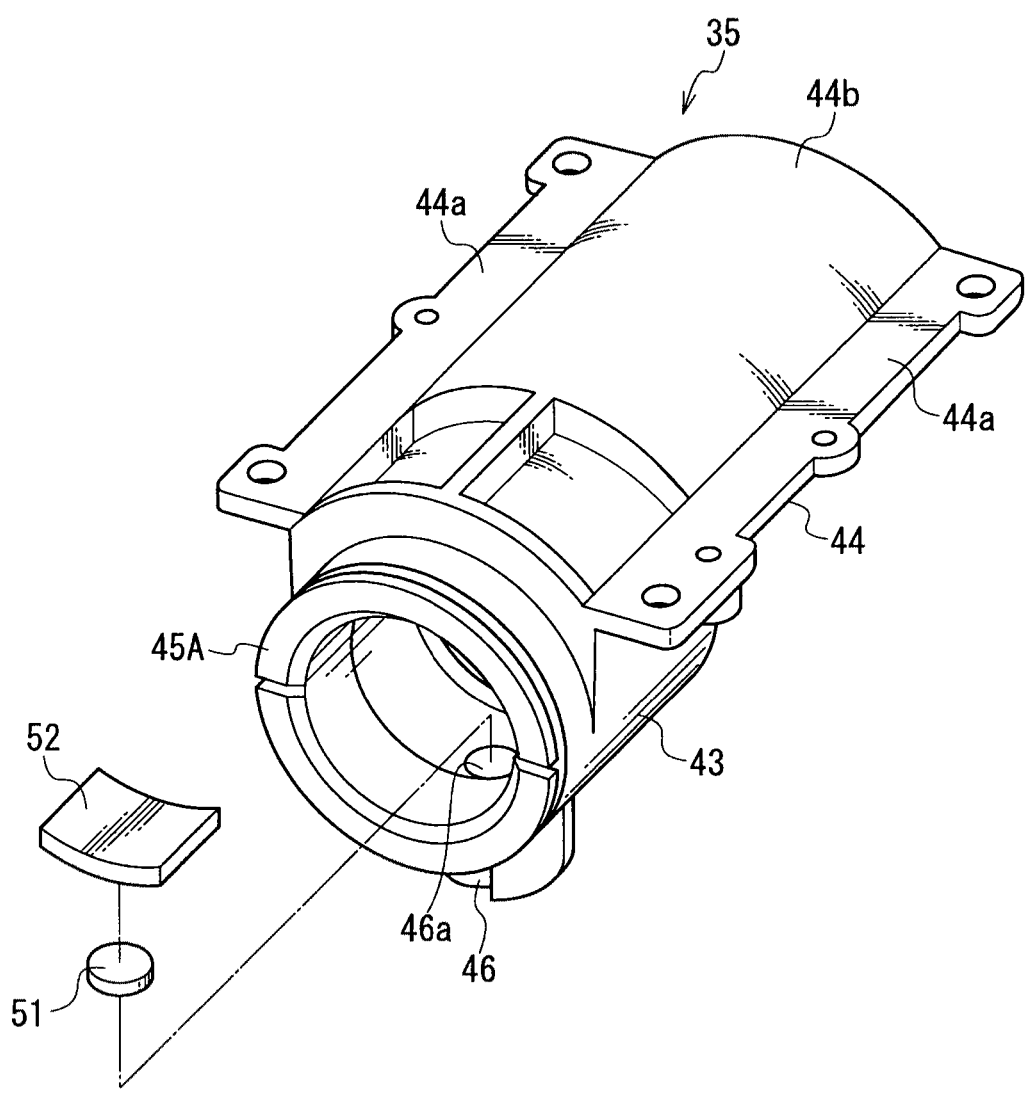
FIG. 14 is a view describing a bearing member, a spacer, and a cushion of an attitude adjusting mechanism of a video camera according to a first example of an imaging device according to an embodiment of the present invention.
Figure 15:
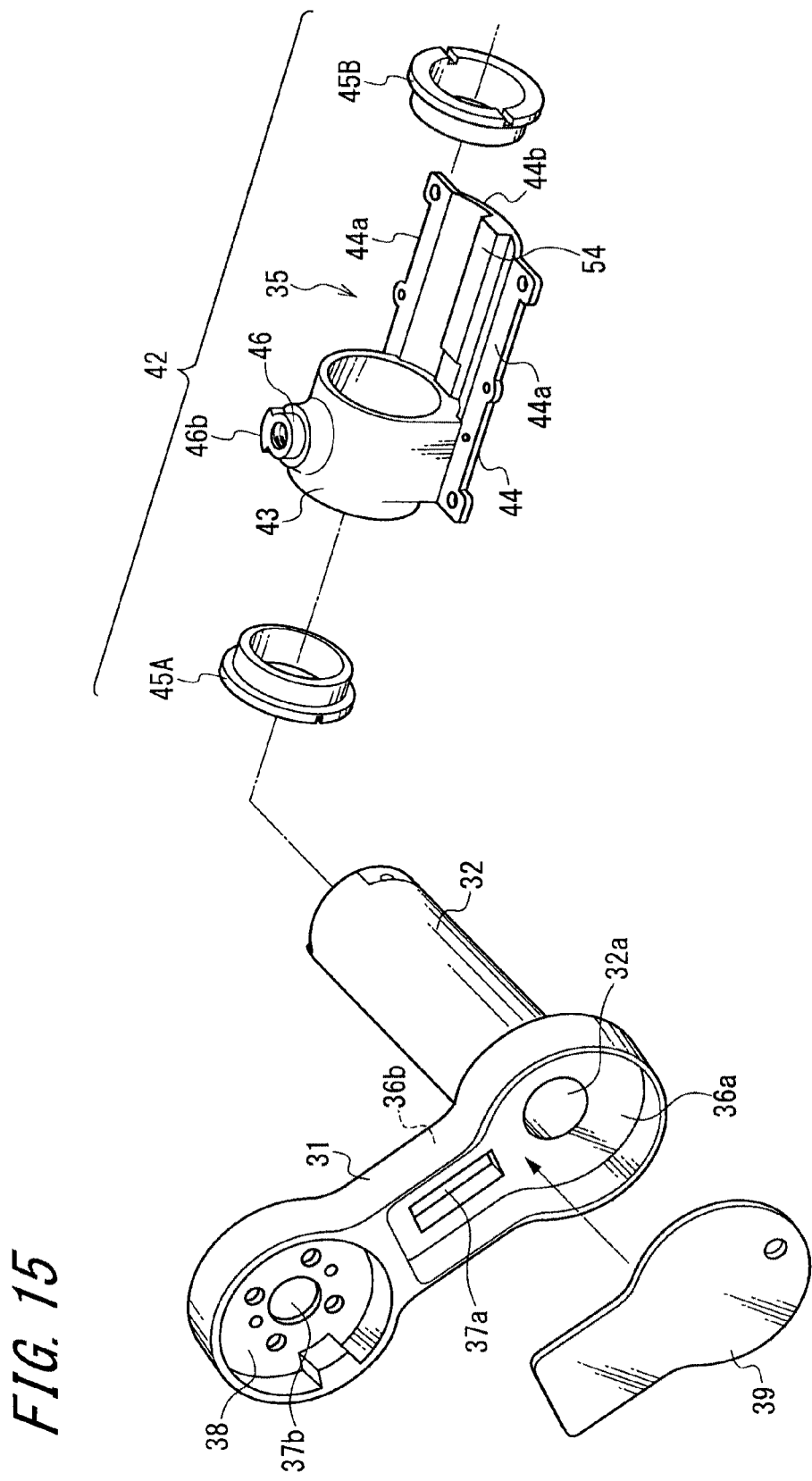
FIG. 15 is a view describing an arm, a slide shaft, a bearing member, and a bearing ring of an attitude adjusting mechanism of a video camera according to a first example of an imaging device according to an embodiment of the present invention.
Figure 16:
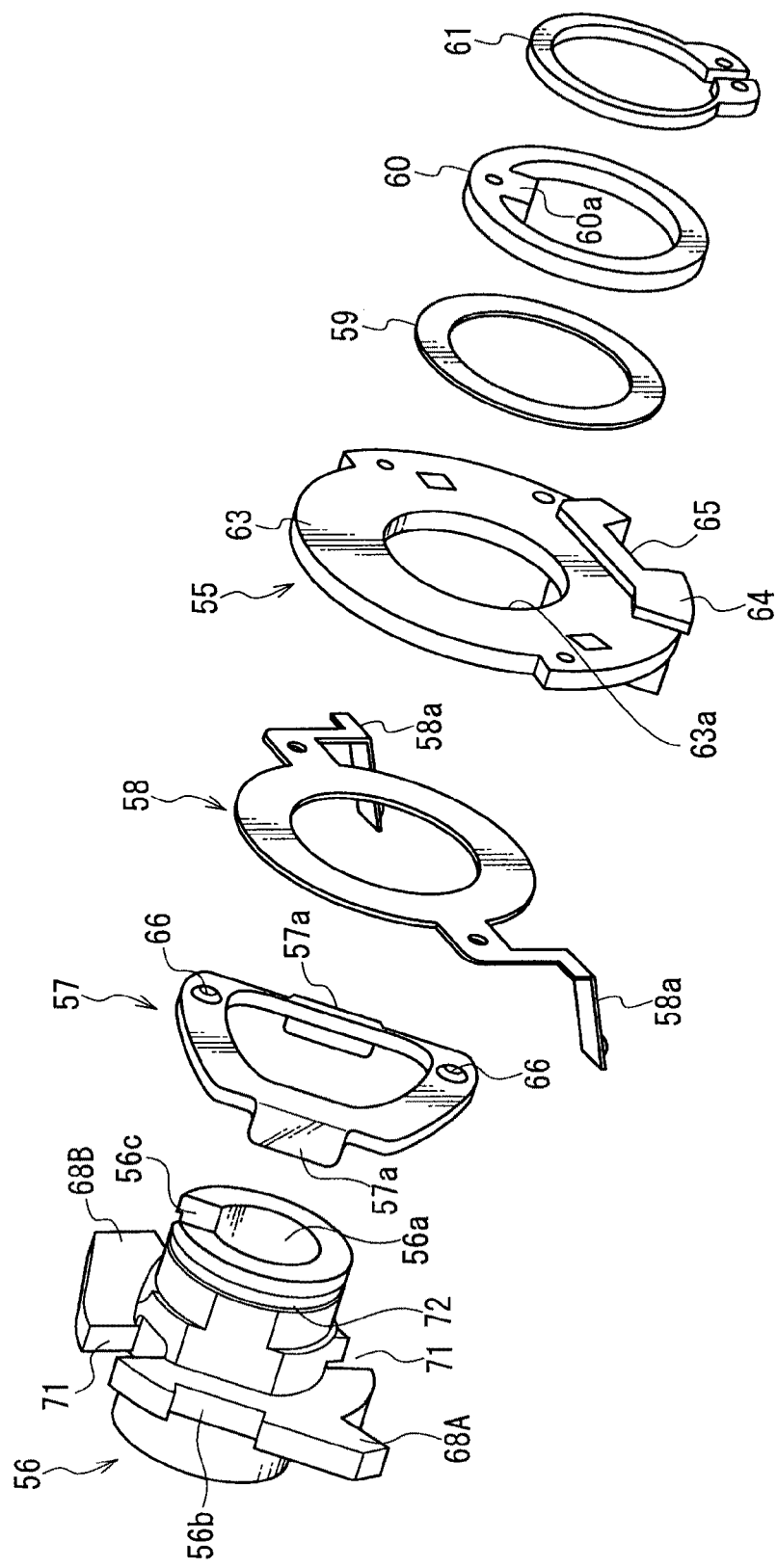
FIG. 16 is an exploded perspective view of a loading part of an attitude adjusting mechanism of a video camera according to a first example of an imaging device according to an embodiment of the present invention.

FIGS. 9A, 9B, 10A, 10B, and 11 are views showing the attitude adjusting mechanism 7. FIG. 12 is a cross-sectional view describing a fastening screw part of the attitude adjusting mechanism 7. FIG. 13 is a view describing a state where the loading part 34 is separated from the slide shaft 32 of the attitude adjusting mechanism 7. FIG. 14 is a view describing a bearing member 35 of the attitude adjusting mechanism 7. FIG. 15 is an exploded perspective view showing the arm 31, the bearing member 35, and the like. FIG. 16 is an exploded perspective view showing the loading part 34 and the like.

As shown in FIG. 15, the arm 31 of the attitude adjusting mechanism 7 is formed by a plate-shaped member having a plane shape like an eyeglass frame. One edge of the slide shaft 32 is continuous with an approximate center of an eye part of one surface of the arm 31, and a shaft center line of the slide shaft 32 is set approximately perpendicular to a plane of the arm 31. A first recess 36a for passage of a wiring harness is provided on a first surface of the arm 31 opposite to the surface connected to the slide shaft 32. A second recess 36b also used for passage of a wiring harness is provided on the second surface of the arm 31 connected to the slide shaft 32, which is opposite to the first surface.

The first recess 36a has a round part provided in one eye part of the arm 31 and a square part extending from the round part to the other eye part. The second recess 36b has a round part provided in the other eye part and a square part extending from the round part to the one eye part. The two square parts are provided in positions overlapping each other, and communicated with each other through a first communication hole 37a. Further, the first surface of the arm 31 has a fitting recess 38 to fix a casing of the electronic viewfinder 4. The fitting recess 38 is communicated with the second recess 36b through a second communication hole 37b.

Consequently, a harness electrically connecting a circuit board of the electronic viewfinder 4 to a circuit board of the camera main body is inserted into a through-hole 32a of the slide shaft 32 and withdrawn to the first recess 36a. The harness is allowed to pass through the first communication hole 37a and withdrawn to the second recess 36b, and is furthermore inserted into the second communication hole 37b and connected to the circuit board of the electronic viewfinder 4. The first recess 36a and the second recess 36b are closed by a closing cover 39 so that the harness is not exposed.

The slide shaft 32 is formed by a hollow cylinder shaft and is rotatably and axially movably supported by a bearing 42 of the bearing member 35. However, the loading part 34 is attached to the slide shaft 32, so that the slide shaft 32 is rotatable and axially movable within a predetermined range described later. The bearing member 35 is formed by a cylinder shaft 43, and a base 44 formed integrally with the cylinder shaft 43. Bearing rings 45A and 45B are mounted on both axial edges of the cylinder shaft 43, and the slide shaft 32 is rotatably supported by the cylinder shaft 43 through both bearing rings 45A and 45B. The bearing 42 are formed by the cylinder shaft 43 and the two bearing rings 45A and 45B.

Figure 12A:
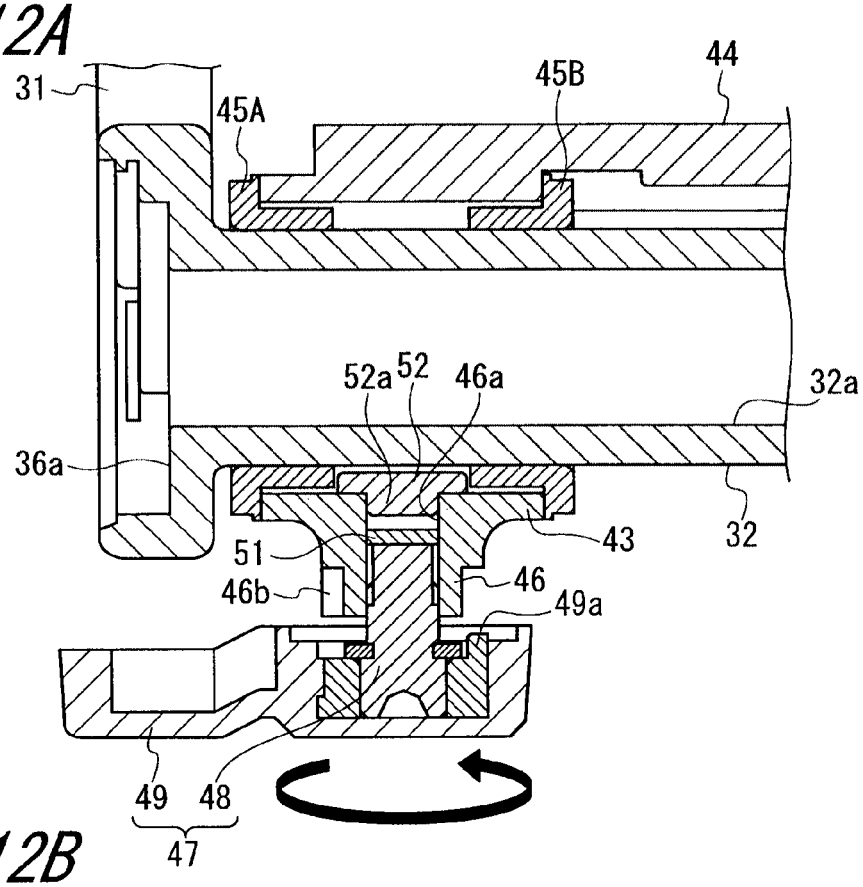
FIG. 12A is a view describing an unlocked state and FIG. 12B is a view describing a locked state.
Figure 12B:
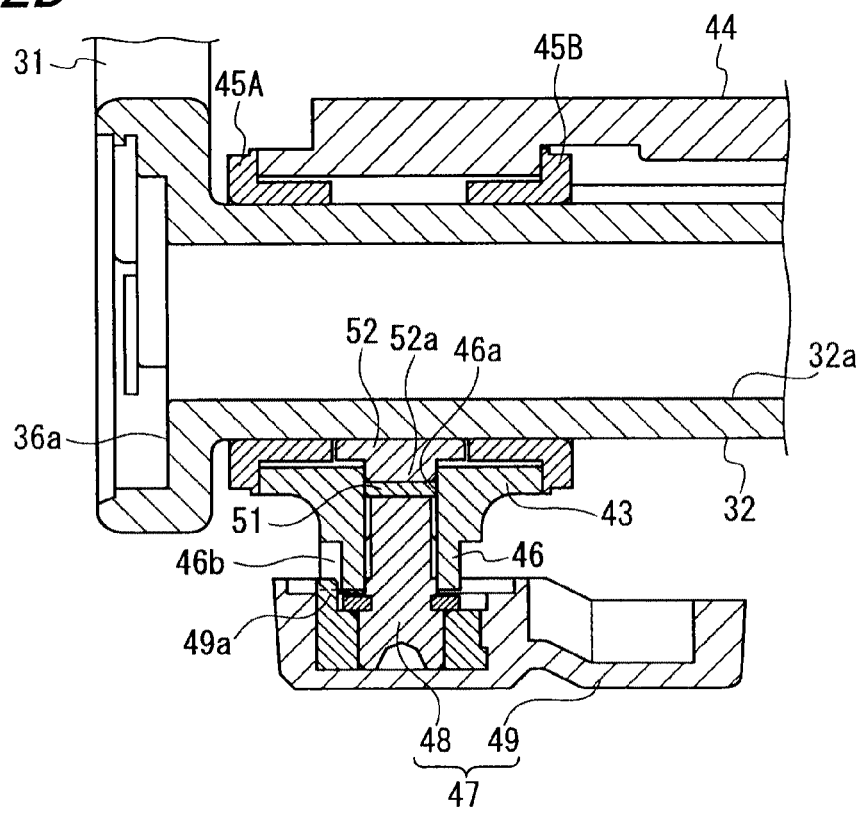
Figure 13:
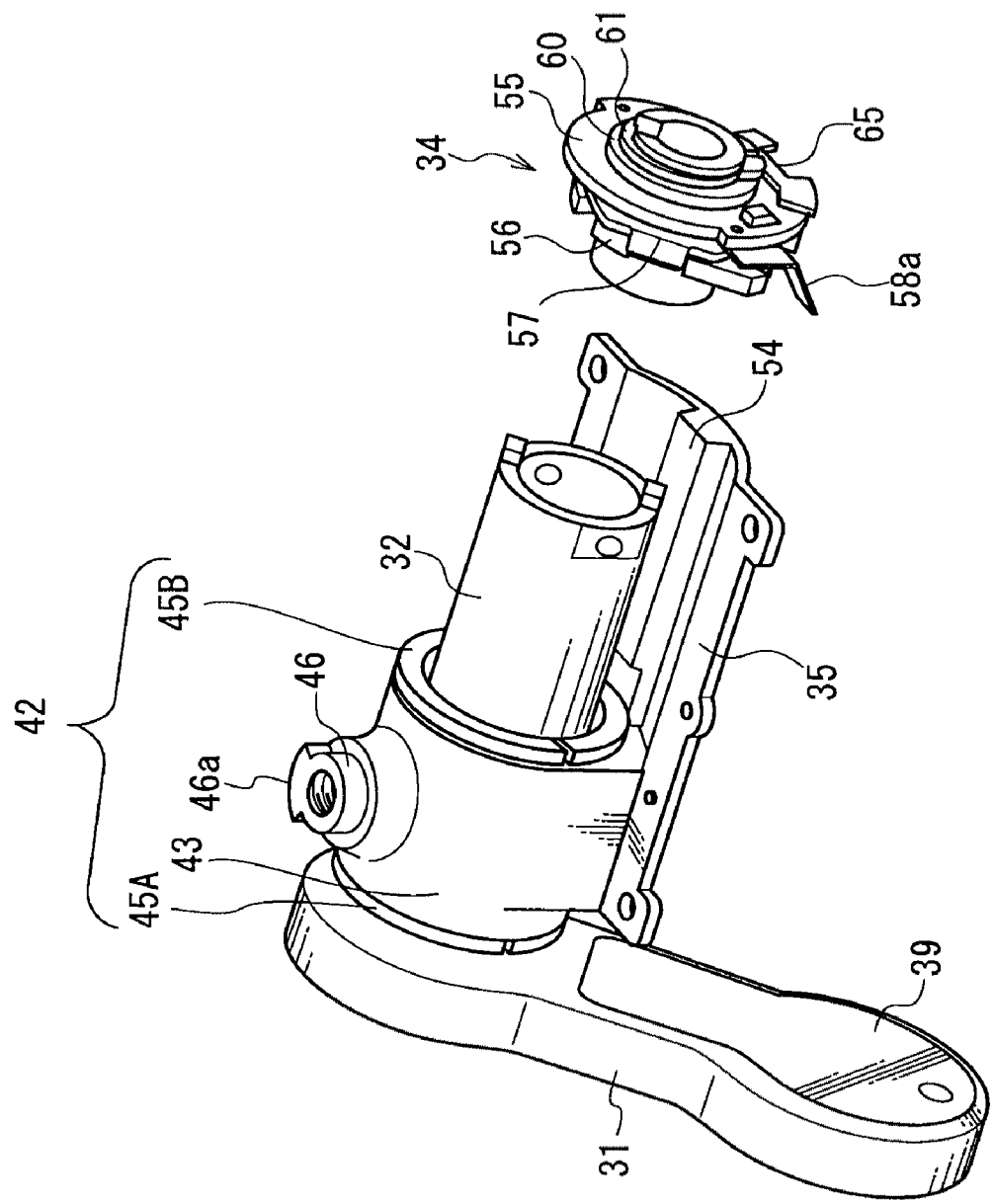
FIG. 13 is a view describing a state where a loading part is separated from an attitude adjusting mechanism of a video camera according to a first example of an imaging device according to an embodiment of the present invention.

As shown in FIGS. 12A, 12B, and 13, the cylinder shaft 43 has a boss 46 protruding radially outward. A radially penetrating screw hole 46a is provided in the boss 46, and a fastening screw 47 is screwed into the screw hole 46a. The fastening screw 47 has: a screw shaft 48 screwed into the screw hole 46a of the boss 46; and a lever 49 rotationally integrated with the screw shaft 48. The lever 49 has a protrusion 49a used as a stopper. The boss 46 has an arc-shaped protrusion receiving part 46b corresponding to the protrusion 49a. Accordingly, the fastening screw 47 may be rotated to a position where the protrusion 49a is brought into contact with one edge surface of the protrusion receiving part 46b.

As shown in FIGS. 12A, 12B, and 14, a spacer 51 is inserted into the screw hole 46a of the boss 46. A cushion 52 is mounted on a side of the spacer 51 opposite to the fastening screw 47. The cushion 52 has a positioning projection 52a fitted in the screw hole 46a for positioning. The cushion 52 is placed in a space formed between the two bearing rings 45A and 45B. The spacer 51 is brought into contact with a tip of the screw shaft 48 of the fastening screw 47, and a fastening force of the screw shaft 48 is transmitted to the cushion 52 through the spacer 51.

The cushion 52 is pressed to an outer circumference of the slide shaft 32, and rotation of the slide shaft 32 is controlled by frictional resistance generated between the cushion 52 and the slide shaft 32 by a fastening force of the fastening screw 47. Specifically, when a pressure force of the spacer 51 by the fastening screw 47 is released to allow the cushion 52 to depart from the slide shaft 32 as shown in FIG. 12A, frictional resistance between the cushion 52 and the slide shaft 32 is eliminated, and the slide shaft 32 is rotated and axially slides easily.

On the contrary, frictional resistance is generated between the cushion 52 and the slide shaft 32 by rotating the fastening screw 47 to one side to press the spacer 51 and press the cushion 52 to the slide shaft 32 by fastening the fastening screw 47, as shown in FIG. 12B. As a result, rotation and axial sliding of the slide shaft 32 become difficult. By fastening the fastening screw 47 to the maximum, the slide shaft 32 is locked in that position with its attitude maintained.

As shown in FIG. 15, the base 44 of the bearing member 35 is formed by a plate-shaped member having a size enough to exhibit strength sufficient to fix the bearing 42 to the handle 6. The base 44 has fixing parts 44a and 44a provided on both widthwise sides, and a gutter 44b provided between the fixing parts 44a and 44a. Each fixing part 44a has a plurality of screw holes punched to screw the bearing member 35 to the handle 6. The gutter 44b is formed to have an arc-shaped cross-section corresponding to rotation of the loading part 34. A rail 54 is provided in an approximate widthwise center of a surface of the gutter 44b on the side where the cylinder shaft 43 is provided. The rail 54 extends parallel to a direction in which the cylinder shaft 43 extends.

The rail 54 of the bearing member 35 limits rotation of the loading part 34 to allow the loading part 34 to be moved only in a direction in which the rail 54 extends. The rail 54 is formed as a protrusion having an angular (in this example, square) cross-section, and a guide groove 56 provided in a base member 55 of the loading part 34 is slidably engaged with the rail 54.

As shown in FIG. 16, the loading part 34 has the base member 55, a rotation limiting shaft 56, a friction spring 57 showing a specific example of an elastic member, a first spacer 58, a second spacer 59, a torque receiving ring 60, and a snap ring 61. The base member 55 prevents rotation of the loading part 34 and guides it in a sliding direction. The base member 55 is formed by a base ring 63 formed in an approximately toric shape, and a guide block 64 combined with and fixed to the base ring 63 in a manner to hold an outer periphery of the base ring 63. A guide groove 65 is provided radially outward of the guide block 64 to be slidably engaged with the rail 54. The slide shaft 32 is slidably inserted into a central hole 63a of the base ring 63.

The material for the base ring 63 is preferably stainless steel (such as SUS304), for example; however, other metal materials such as steel may also be used. The material for the guide block 64 is preferably POM (polyacetal), for example; however, other engineering plastic materials may also be used, obviously.

The first spacer 58 is placed on one surface of the base member 55, and the second spacer 59 is placed on the other surface. The first spacer 58 and the second spacer 59 are formed as ring-shaped members, respectively, and intend to reduce sliding resistance generated between the base member 55 and the slide shaft 32. However, the first spacer 58 also functions as a member to ground the electronic viewfinder 4. Therefore, the first spacer 58 has two grounding pieces 58a protruding radially outward. The two grounding pieces 58a are bent in an approximate V-shape to have an appropriate degree of elasticity, and their tips may be brought into sliding contact with the base 44 of the bearing member 35.

The friction spring 57 is placed on a side of the first spacer 58 opposite to the base member 55. The friction spring 57 is formed by inflecting a ring-shaped plate spring in a corrugated shape so as to have elasticity, and a load by the loading part 34 is generated by a spring force of the friction spring 57. Sliding projections 66 for point contact with the first spacer 58 are provided in two places diametrically facing each other on a projection side of the friction spring 57. Further, hook pieces 57a and 57a for positioning are provided in two places in a direction perpendicular to the sliding projections 66 and 66 of the friction spring 57.

The material for the first spacer 58 and the second spacer 59 is preferably stainless steel (such as SUS304CSP), for example; however, other spring materials such as spring steel may also be used. The material for the friction spring 57 is preferably spring steel, for example; however, other spring materials may also be used.

The rotation limiting shaft 56 of the loading part 34 is formed by a cylindrical member having a central hole 56a into which a harness is inserted. The shaft 56 is fitted in and fixed to an opening edge of the slide shaft 32. The rotation limiting shaft 56 has two stopper pieces 68A and 68B protruding radially outward on its outer circumference. The two stopper pieces 68A and 68B limit a rotation angle of the rotation limiting shaft 56. When the rotation limiting shaft 56 is rotated to one side, the one stopper piece 68A is brought into contact with one side surface of the rail 54 provided in the base 44 of the bearing member 35; when the shaft 56 is rotated to the other side, the other stopper piece 68B is brought into contact with the other side surface of the rail 54. Accordingly, the rotation limiting shaft 56 is rotatable within an angle range obtained by subtracting a width of the rail 54 from 360°.

A notch 71 is provided between circumferential edges of each of the two stopper pieces 68A and 68B. Two dowels 69 provided on the opening edge of the slide shaft 32 are engaged with the notches 71. The two dowels 69 are engaged with the two notches 71 and 71 during assembly, so that the rotation limiting shaft 56 is rotationally integrated with the slide shaft 32. Further, the two stopper pieces 68A and 68B have two notches 56b with which the two hook pieces 57a and 57a of the friction spring 57 are engaged. The friction spring 57 is positioned relative to the rotation limiting shaft 56 and rotationally integrated with the shaft 56 by engaging the two hook pieces 57a and 57a with the two notches 56b.

As shown in FIG. 13, the friction spring 57 and the base member 55 are mounted on one side of the two stopper pieces 68A and 68B in the rotation limiting shaft 56, and the other side of the two stopper pieces 68A and 68B is fitted in the opening edge of the slide shaft 32. Specifically, the friction spring 57, the first spacer 58, the base member 55, the second spacer 59, and the torque receiving ring 60 are sequentially mounted on one side of the rotation limiting shaft 56, and are retained by the snap ring 61 located outside of them. Therefore, one side of the rotation limiting shaft 56 has a circumferentially continuous cyclic groove 72 in which the snap ring 61 is fitted.

The torque receiving ring 60 is formed by a ring-shaped member almost as large as the second spacer 59, and has a positioning projection 60a protruding radially inward. A shaft notch 56c corresponding to the positioning projection 60a is provided on one edge of the rotation limiting shaft 56. The torque receiving ring 60 is rotationally integrated with the rotation limiting shaft 56 by engaging the positioning projection 60a with the shaft notch 56c. Assembly of the base member 55 and the like to the rotation limiting shaft 56 forms the loading part 34 applying a load between the bearing 42 and the slide shaft 32 to generate frictional resistance. The material for the torque receiving ring 60 is preferably stainless steel (such as SUS304), for example; however, other metal materials such as steel may also be used, obviously.

Figure 9A:
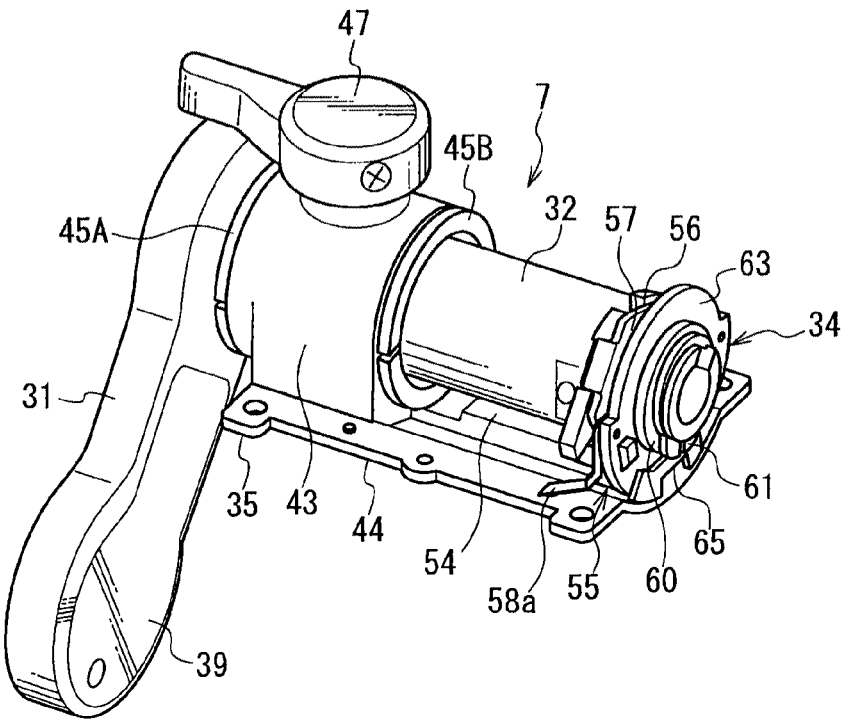
FIG. 9A is a perspective view and FIG. 9B is a front view.
Figure 9B:
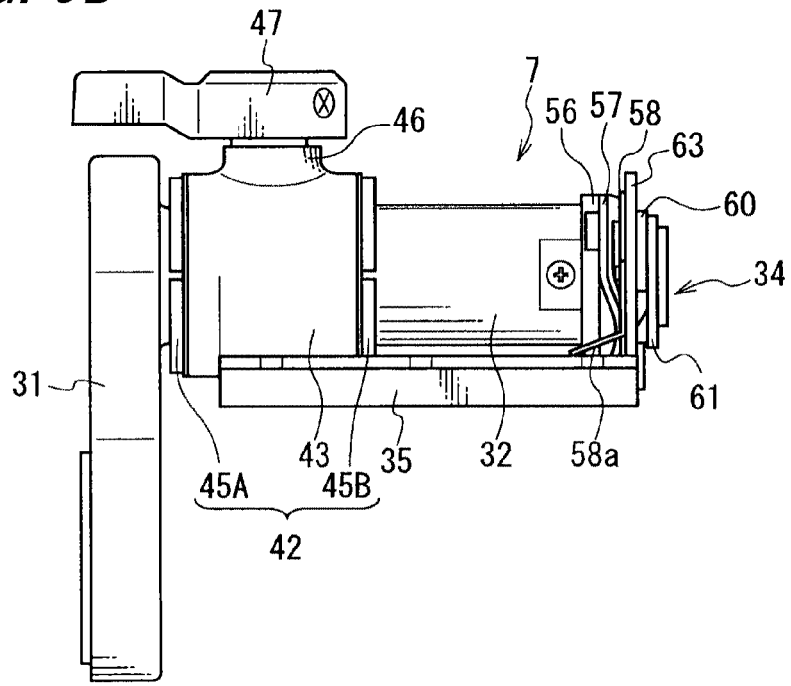

FIG. 13 is a view describing a state where the loading part 34 is being assembled to the slide shaft 32 supported by the bearing 42 of the bearing member 35. One side of the rotation limiting shaft 56 of the loading part 34 is fitted in the opening edge of the slide shaft 32. Then, as shown in FIGS. 9A and 9B, the fitted part is screwed by a fixing screw 73. Accordingly, the loading part 34 is fixed to the slide shaft 32. Here, the guide groove 65 provided in the base member 55 of the loading part 34 is engaged with the rail 54 of the bearing member 35.

Figure 10A:
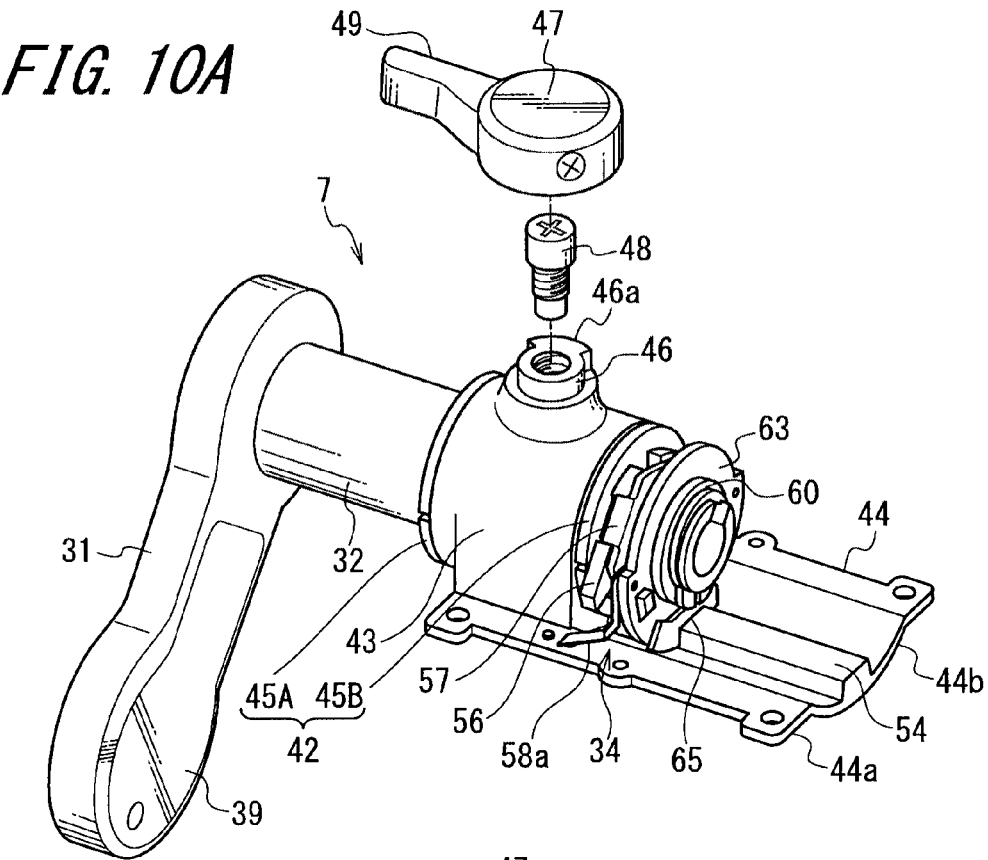
FIG. 10A is an exploded perspective view of a lever and a screw shaft and FIG. 10B is a front view of the same.
Figure 10B:
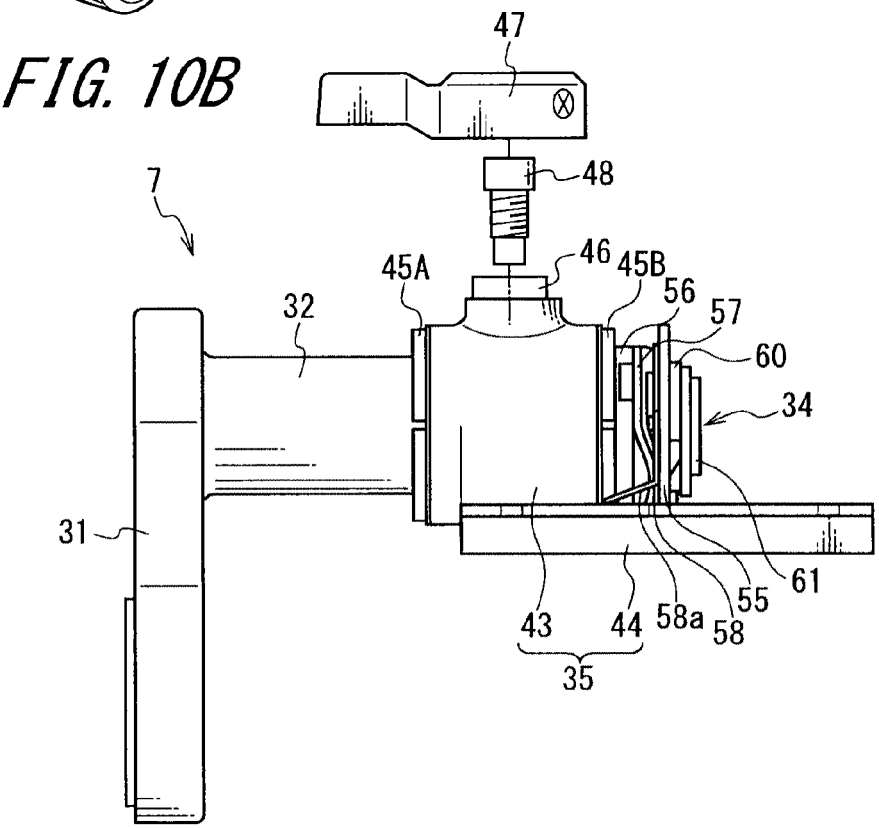

Accordingly, the slide shaft 32 and the arm 31 integrated with the shaft are guided by the rail 54 of the bearing member 35 by releasing a fastening force of the bearing 42, making it possible to move the slide shaft 32 axially straight without rotating the slide shaft 32. FIGS. 9A and 9B show a state where the slide shaft 32 is withdrawn to the storage part and the arm 31 is moved closest to the camera main body. On the other hand, FIGS. 10A and 10B show a state where the slide shaft 32 is withdrawn from the storage part and the arm 31 is moved most remote from the camera main body.

Here, it is possible to adjust a degree of force which may be necessary to move the slide shaft 32 axially by adjusting a fastening force of the fastening screw 47 of the bearing 42. The protruded position (amount of protrusion) of the slide shaft 32 may be set in any position within a range between a position shown in FIGS. 9A and 9B and a position shown in FIGS. 10A and 10B.

Figure 11:
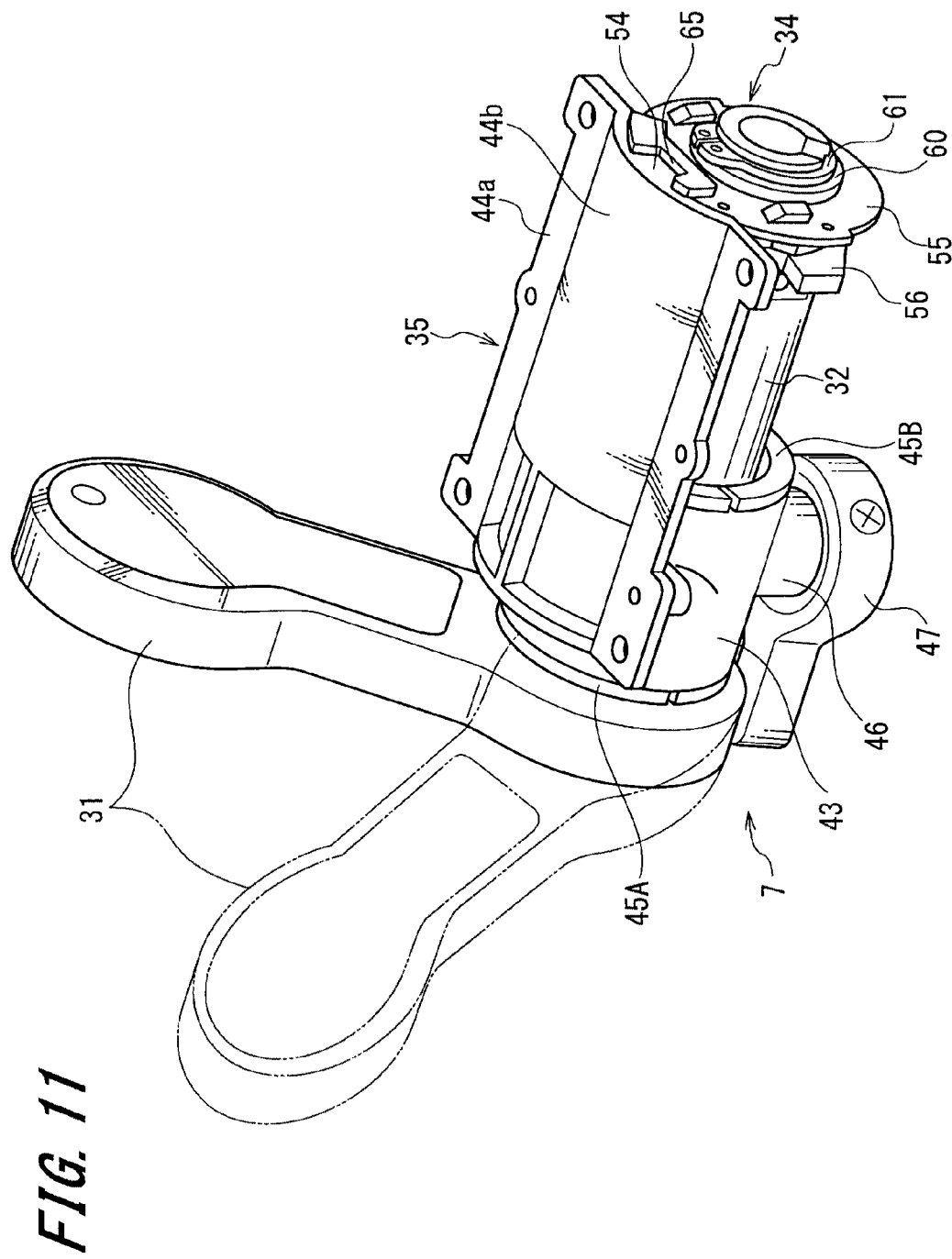
FIG. 11 is a bottom view describing an attitude adjusting mechanism of a video camera according to a first example of an imaging device according to an embodiment of the present invention.

After releasing a fastening force of the bearing 42, the arm 31 may turn by rotating the arm 31 around the slide shaft 32 as a rotation center. FIG. 11 is a view describing rotation of the arm 31, where the arm 31 may turn without moving the slide shaft 32 axially. Here, the amount of rotation of the arm 31 is limited by the rotation limiting shaft 56 provided in the loading part 34 and the rail 54. Specifically, as shown in FIG. 11, the arm 31 may be set in any position within a range between an angle position indicated by a solid line and an angle position indicated by a chain double-dashed line.

Here, a constant load is axially applied to the slide shaft 32 by the friction spring 57 (FIG. 16) provided in the loading part 34. For this reason, in order to rotate the arm 31, it may be necessary to rotate the slide shaft 32 against a spring force of the friction spring 57. Rotation of the arm 31 based on a self-weight or the like of the electronic viewfinder 4 may be prevented by setting the spring force of the friction spring 57 appropriately larger than the self-weight or the like of the electronic viewfinder 4. As a result, the arm 31 may be maintained in any attitude even in a state where a fastening force of the slide shaft 32 by the fastening screw 47 is released. Accordingly, the hand used for loosening the fastening screw 47 may be subsequently used for applying a force to the electronic viewfinder 4 to change its attitude, and an attitude of the electronic viewfinder 4 may be simply adjusted by one-touch operation by one hand.

The material for the camera main body 2, the handle 6, and the bearing member 35 is preferably a magnesium alloy, for example; however, it is possible to use not only other metal materials such as an aluminum alloy, obviously, but also engineering plastic materials having high strength. The material for the arm 31 and the slide shaft 32 is preferably an aluminum alloy, for example; however, it is possible to use not only other metal materials, obviously, but also engineering plastic materials having high strength. The material for the spacer 51 and the screw shaft 48 is preferably stainless steel (such as SUS304), for example; however, other metal materials such as steel may also be used.

The material for the bearing rings 45A and 45B is preferably POM (polyacetal), for example; however, other engineering plastic materials may also be used. The material for the lever 49 of the fastening screw 47 is preferably PBT (polybutylene terephthalate), for example; however, other engineering plastic materials may also be used. The material for the cushion 52 is preferably a rubber material such as silicone rubber or acrylic rubber, for example; however, a soft engineering plastic material or the like may also be used.

As shown in FIGS. 6 and 7, the electronic viewfinder 4 is attached to a tip of the arm 31. The electronic viewfinder 4 is placed in a position obliquely upward from the optical axis of the lens device 3 and is rotatably attached to the arm 31. The electronic viewfinder 4 is formed including a casing 75, a cylinder shaft 76, and an eyecup 77. A display such as a liquid crystal display or an organic EL display is stored in the casing 75. The cylinder shaft 76 having one or more lenses inside it is detachably attached to the casing 75 to cover the display. The eyecup 77 is mounted on a rear tip of the cylinder shaft 76.

Figure 17:
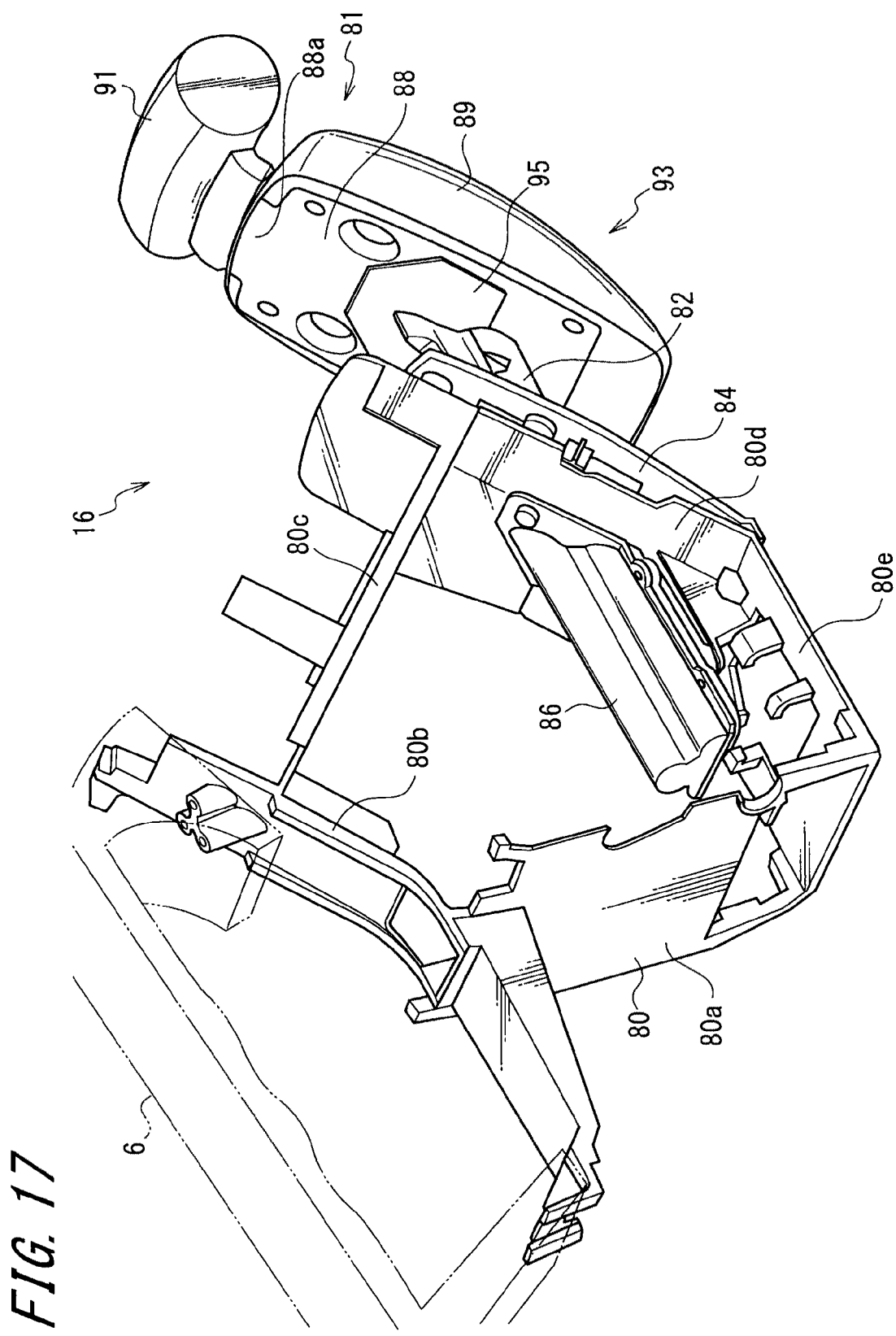
FIG. 17 is a view describing a state where a shoulder pad of a video camera according to a first example of an imaging device according to an embodiment of the present invention is supported by a camera main body.
Figure 18:
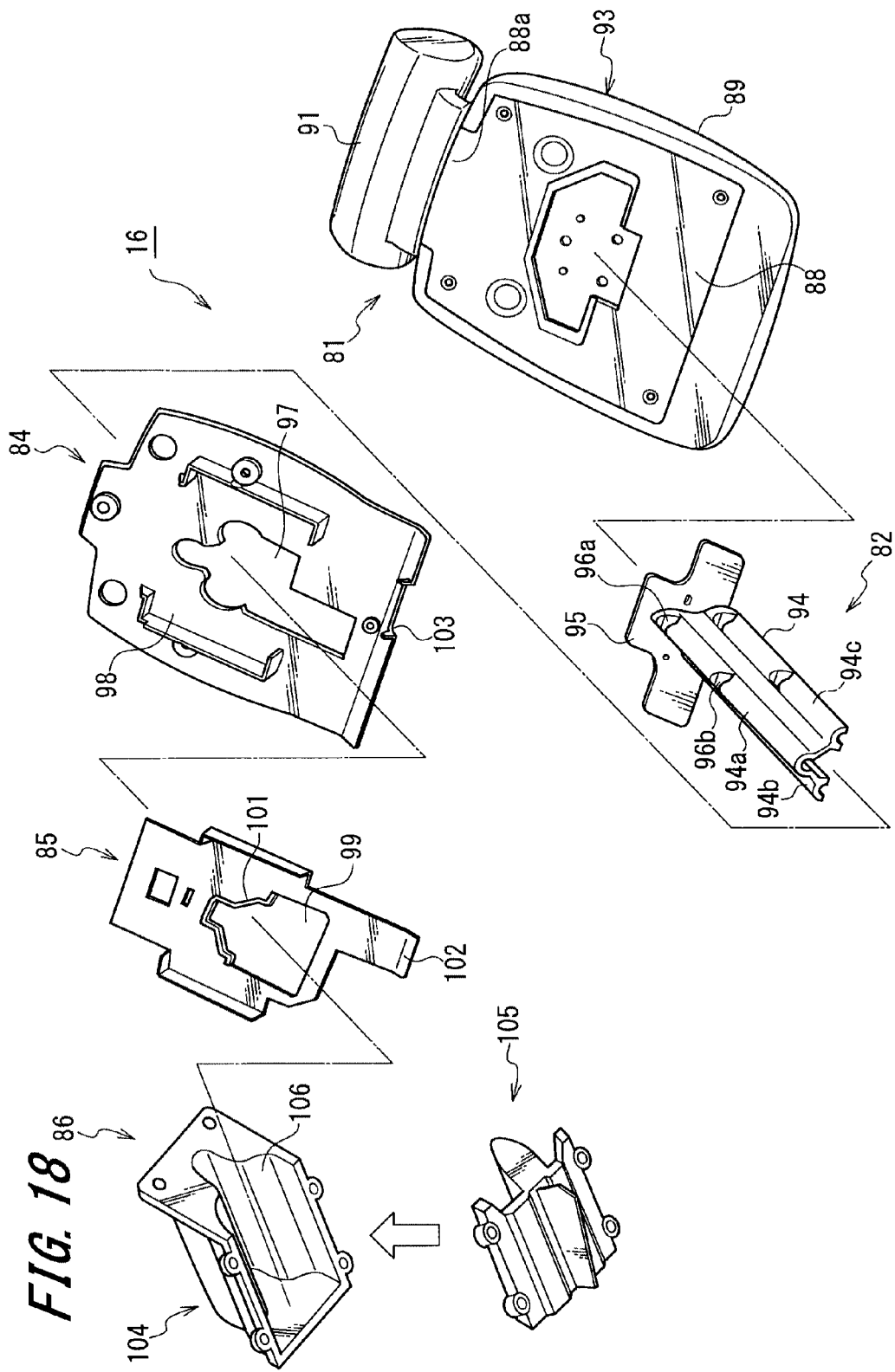
FIG. 18 is an exploded view describing a shoulder pad of a video camera according to a first example of an imaging device according to an embodiment of the present invention.

FIGS. 17 to 22 are views describing the shoulder pad 16 and its support structure. Specifically, FIG. 17 is a view describing a state where the shoulder pad 16 is supported by a rear support frame 80 forming a part of the camera main body 2, and FIG. 18 is an exploded perspective view of the shoulder pad 16. The rear support frame 80 forms a rear framework of the camera main body 2, includes a front surface 80*a*, an upper surface 80*b*, an upper slope 80*c*, a lower slope 80*d*, and a bottom surface 80*e* as shown in FIG. 17, and is formed as a pentagonal frame material as a whole.

The front surface 80*a* of the rear support frame 80 forms a partition wall partitioning a longitudinal middle of the camera main body 2. A longitudinal middle of the upper surface 80*b* on a side of the handle 6 facing the camera main body 2 is continuous with an upper edge of the front surface 80*a*. The upper surface 80*b* is formed bent upward like a bow, and an upper edge of the upper slope 80*c* is continuous with an upper part of the upper surface 80*b*. The battery storage part 21 is set outside the upper slope 80*c*. The cheek pad 22 is attached horizontally with the battery storage part 21. An upper edge of the lower slope 80*d* is continuous with a lower edge of the upper slope 80*c*. The shoulder pad 16 is attached outside the battery storage part 21. Further, a rear part of the bottom surface 80*e* is continuous with a lower edge of the lower slope 80*d*.

The bottom surface 80*e* of the rear support frame 80 is formed as a horizontal surface extending horizontally. The lower slope 80*d* is formed in the rear part 2*a* of the camera main body 2 as a slope inclined upward with respect to the bottom surface 80*e* and continuous with the bottom surface 80*e*. The cheek pad 22, which is brought into contact with the cheek of the user, is provided on the upper slope 80*c* continuous with an upper part of the lower slope 80*d*, so that an attitude of the cheek pad 22 in contact with the cheek may be changed based on a difference in the angle to the cheek.

Figure 19:
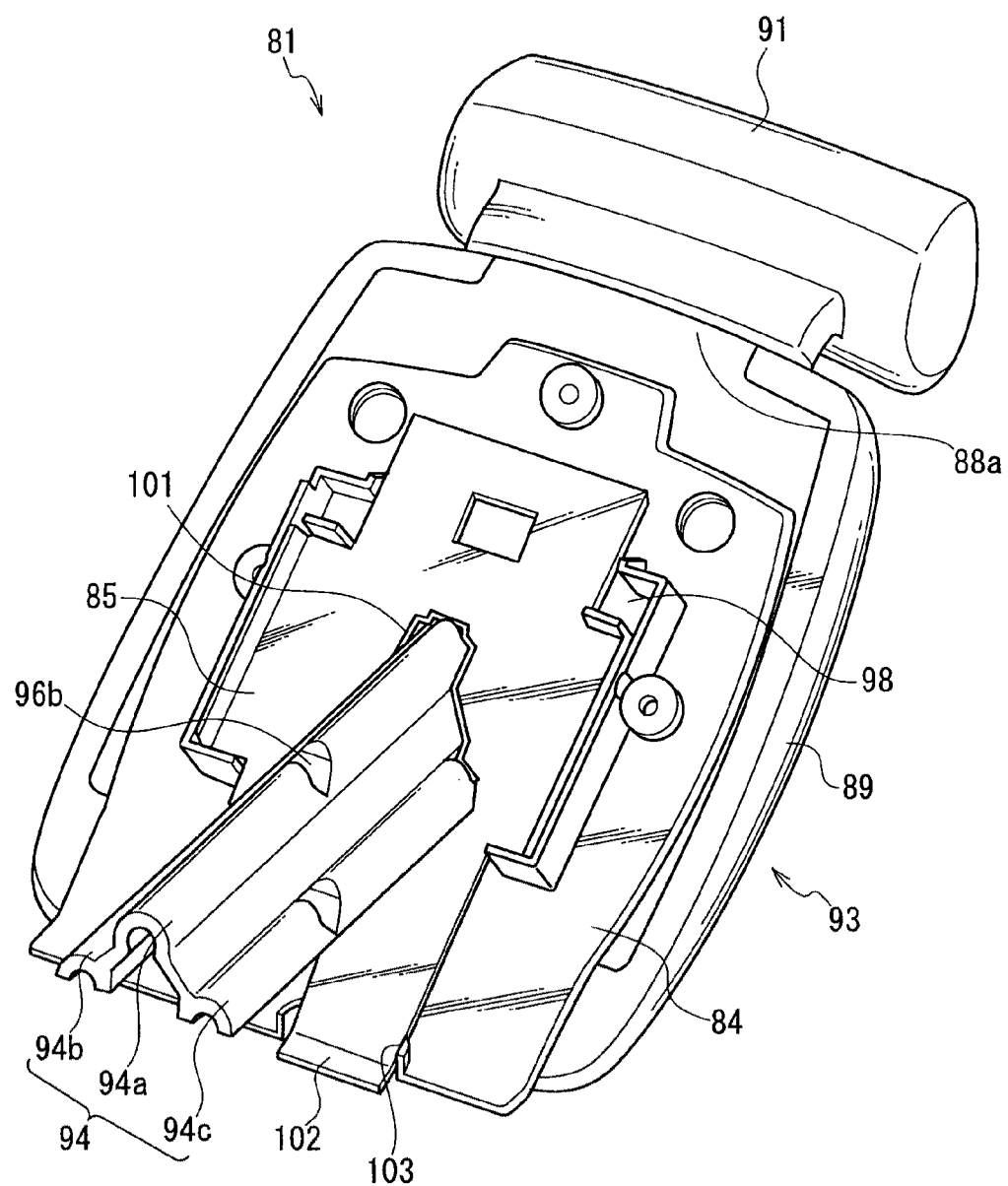
FIG. 19 is a view describing a locked state when a shoulder pad of a video camera according to a first example of an imaging device according to an embodiment of the present invention is stored.
Figure 20:
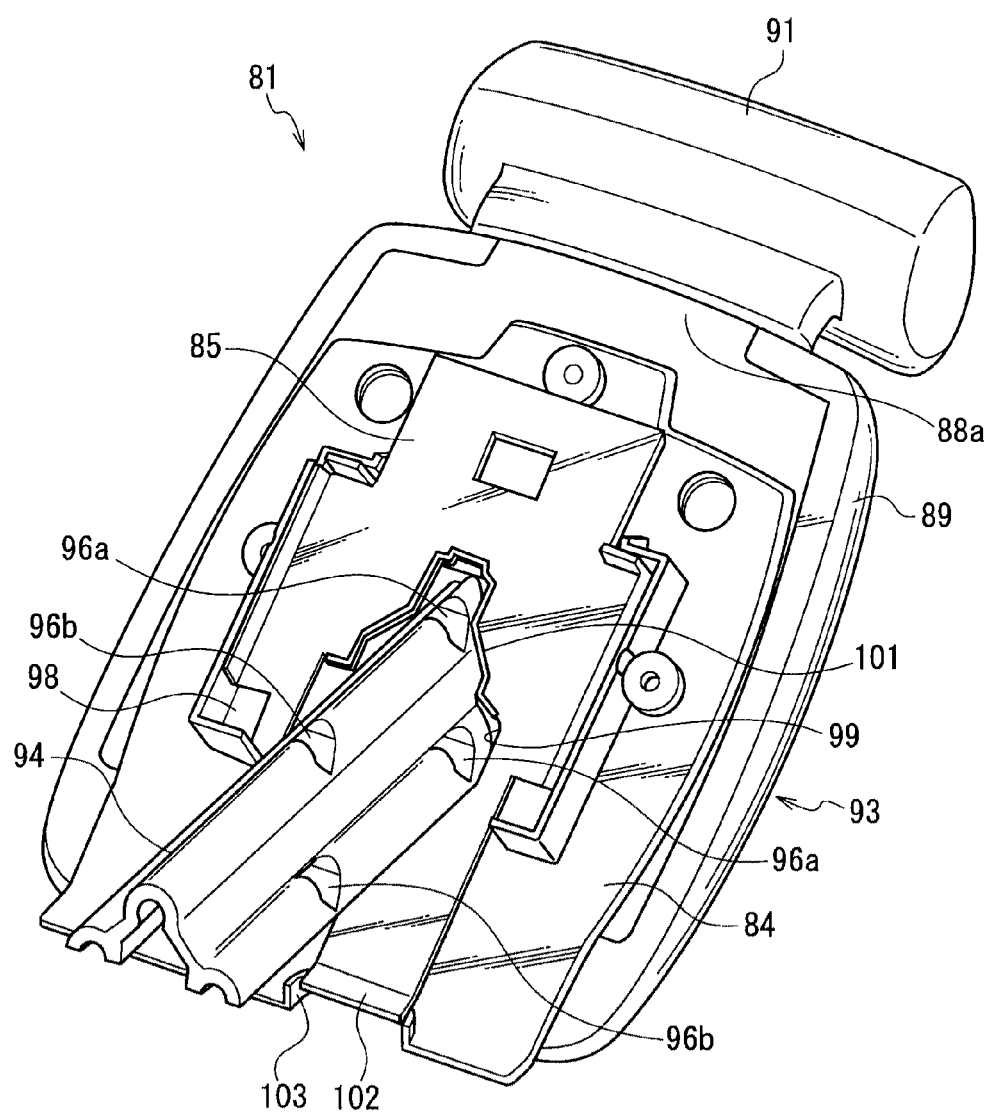
FIG. 20 is a view describing an unlocked state when a shoulder pad of a video camera according to a first example of an imaging device according to an embodiment of the present invention is stored.
Figure 21:
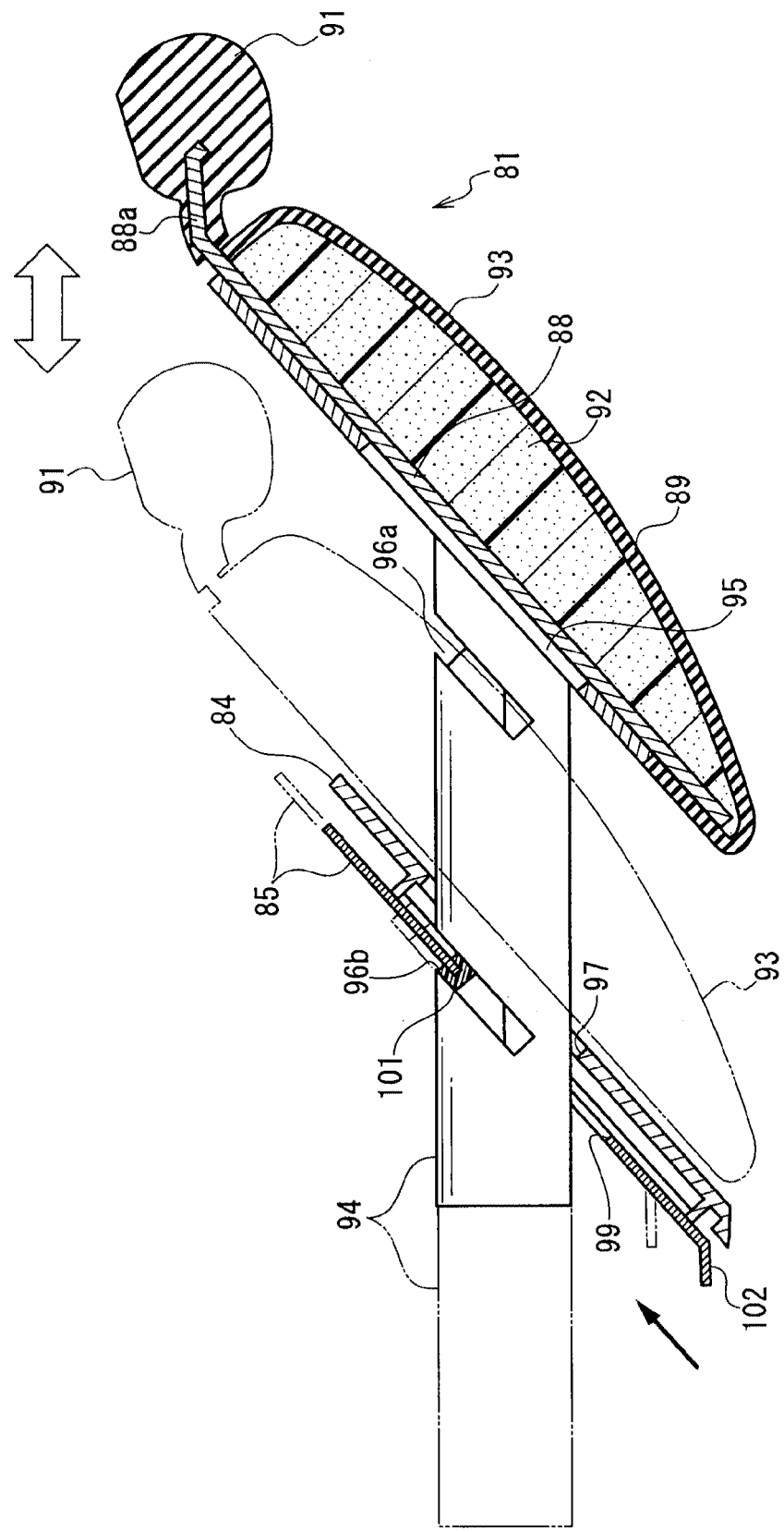
FIG. 21 is a partial cross-sectional view describing a locked state and an unlocked state of a shoulder pad of a video camera according to a first example of an imaging device according to an embodiment of the present invention.

As shown in FIGS. 17 to 21, the shoulder pad 16 is formed including a pad member 81, a shaft-shaped member 82, a cover plate 84, a slide plate 85, and a sheath-shaped member 86. The pad member 81 has: an approximately quadrangular base plate 88; a bag cover 89 covering a front surface of the base plate 88 facing the shoulder rest; and a hook piece 91 fixed to a protrusion 88*a* protruding upward from an upper edge of the base plate 88. As shown in FIG. 21, a cushioning material 92 such as a highly flexible soft plastic material or rubbery elastic material is stored in the bag cover 89. The hook piece 91 is formed of a rubbery flexible material having suitable flexibility. An abutting part 93 is formed by the base plate 88, the bag cover 89, and the cushioning material 92.

The abutting part 93 of the shoulder pad 16 is used by allowing its front surface to be pushed against the shoulder of the user, and mainly functions to allow the weight of the video camera 1 to partially act on the shoulder to maintain the video camera 1 in a predetermined attitude. On the other hand, the hooking piece 91 is hooked over the shoulder of the user, and mainly functions to prevent slipping of the video camera 1 from the shoulder. One axial edge of the shaft-shaped member 82 is fixed to a back surface of the abutting part 93.

The shaft-shaped member 82 is formed by: a shaft 94 integrally formed by connecting three bars 94*a*, 94*b*, and 94*c* each having a C-shaped cross-section to each other; and a fixing plate 95 fixed to one axial edge of the shaft 94. The three bars 94*a*, 94*b*, and 94*c* are placed to form a triangle. The upper bar 94*a* is connected to the left lower bar 94*b* by a first connection piece 94*d*, and the upper bar 94*a* is connected to the right lower bar 94*c* by a second connection piece 94*e*. Accordingly, the shaft 94 forms a triangle as a whole, and the three bars 94*a*, 94*b*, and 94*c* are opened in an identical direction, respectively.

One edge surface of the shaft 94 is formed as an inclined surface having an angle equal to an inclined angle of the lower slope 80*d*. The fixing plate 95 is provided integrally with the inclined surface of the shaft 94. The shaft-shaped member 82 is fixed to the pad member 81 by screwing the fixing plate 95 to the base plate 88 using a fixing screw. Further, a first lock groove 96*a* and a second lock groove 96*b* to lock the shaft-shaped member 82 are provided in two axial places on an upper surface of the shaft 94. The first lock groove 96*a* is placed closer to the fixing plate 95 and used for locking in a state in which the shoulder pad 16 has been pushed in to be stored. The second lock groove 96*b* is placed more remote from the fixing plate 95 and used for locking in a state in which the shoulder pad 16 has been withdrawn.

The cover plate 84 is attached to the lower slope 80*d* of the rear support frame 80 to cover a lower part of the back surface of the camera main body 2. An approximate center of the cover plate 84 has a through-hole 97 having a shape corresponding to a cross-sectional shape of the shaft 94. A slide support 98 is provided inside the cover plate 84 to surround the through-hole 97. The slide plate 85 is vertically slidably supported by the slide support 98. An approximate center of the slide plate 85 has a through-hole 99 having a shape corresponding to a cross-sectional shape of the shaft 94. A cushioning material 101 is attached to an upper part of the through-hole 99 to protect the first lock groove 96*a* and the second lock groove 96*b*.

The slide plate 85 is always biased downward by a coil spring (not shown). In this state of being biased downward, the cushioning material 101 mounted on the through-hole 99 of the slide plate 85 is engaged with the first lock groove 96*a* or the second lock groove 96*b* of the shaft-shaped member 82, as shown in FIGS. 19 and 21. Since the slide plate 85 is formed of a material harder than that of the shaft-shaped member 82 and is always biased in an engaging direction by the spring, the cushioning material 101 is used for preventing the slide plate 85 from cutting the lock grooves 96*a* and 96*b*.

FIG. 19 shows a state where the slide plate 85 is engaged with the first lock groove 96*a*. This state corresponds to the state of FIG. 3, where the shoulder pad 16 is closest to the camera main body 2. On the other hand, FIG. 20 shows an (unlocked) state where the slide plate 85 is allowed to slide upward to release engagement with the first lock groove 96*a*. FIG. 21 shows a state where the slide plate 85 is engaged with the second lock groove 96*b*. This state corresponds to the state of FIG. 4, where the shoulder pad 16 is moved most remote from the camera main body 2.

The slide plate 85 is manually operated by the user. Therefore, an operation piece 102 protruding downward is provided integrally with the slide plate 85. A notch 103 for passage of the operation piece 102 is provided corresponding to the operation piece 102 in a lower part of the cover plate 84. A tip of the operation piece 102 is exposed outside the camera main body 2 through the notch 103, so that the slide plate 85 may be operated from outside.

Figure 22A:
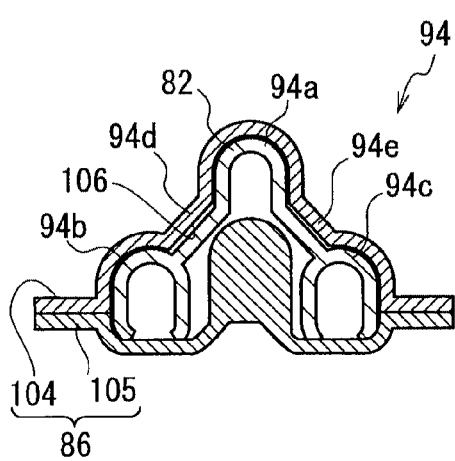
FIG. 22A is a cross-sectional view of a first example.

The shaft 94 penetrating the through-hole 97 of the cover plate 84 and the through-hole 99 of the slide plate 85 is slidably maintained by the sheath-shaped member 86 fixed to the camera main body 2. The sheath-shaped member 86 is formed by a combination of an upper support frame 104 and a lower support frame 105 vertically dividable, as illustrated in FIG. 22A. By superposing the upper support frame 104 and the lower support frame 105 on each other, a shaft-shaped storage part 106 is formed between the support frames 104 and 105, which is a cylinder formed by a space having a shape and a size corresponding to those of the shaft 94. As shown in FIG. 17, the sheath-shaped member 86 is screwed and fixed to the rear support frame 80.

A torsion-resistant structure may be formed with a reduced width and increased strength by placing the shaft 94 of the shaft-shaped member 82 so that the three bars 94a, 94b, and 94c each having a C-shaped cross-section form a triangle, as in this example shown in FIG. 22A. Accordingly, the shaft-shaped member 82 may have increased strength against an external force applied obliquely, and torsion of the shoulder pad 16 may be effectively suppressed. In this example, the shoulder pad 16 is placed in any of two set positions; however, it may be placed in any of three or more set positions, obviously.

The material for the shaft-shaped member 82 and the sheath-shaped member 86 is preferably glass-containing PC+ABS (polycarbonate+acrylonitrile-butadiene-styrene resin); however, other engineering plastic materials may also be used. The material for the cover plate 84 is preferably ABS, for example; however, other engineering plastic materials may also be used. The material for the base plate 88 and the slide plate 85 is preferably stainless steel (such as SUS304), for example; however, other metal materials such as steel may also be used.

Figure 22B:
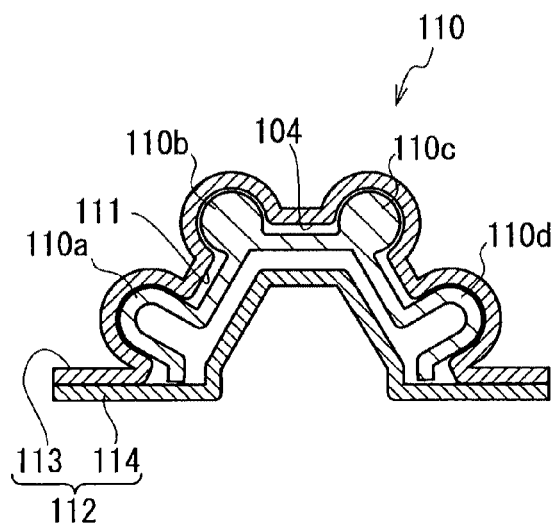
FIG. 22B is a cross-sectional view of a second example.
Figure 22C:
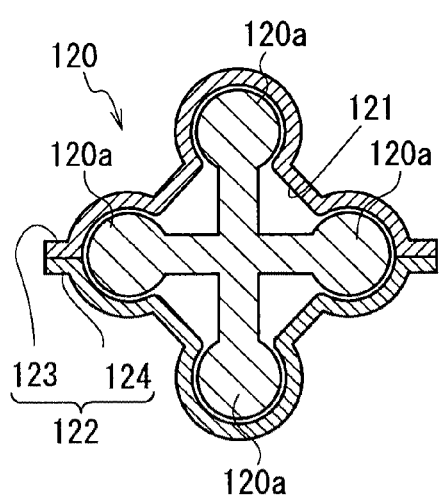
FIG. 22C is a cross-sectional view of a third example.
Figure 22D:
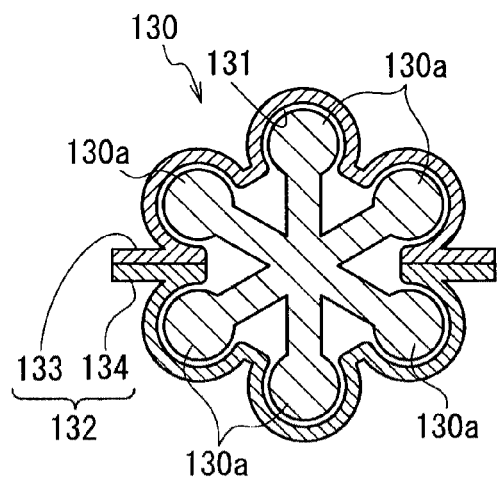
FIG. 22D is a cross-sectional view of a fourth example.

FIGS. 22B, 22C, and 22D show another example of a shaft-shaped member according to an embodiment of the present invention. A shaft-shaped member 110 shown in FIG. 22B is formed by placing four bars 110a, 110b, 110c, and 110d each having a C-shaped cross-section to form a trapezoid. A sheath-shaped member 112 is formed by an upper support frame 113 and a lower support frame 114, which has a shaft-shaped storage part 111 formed by a space having a shape corresponding to a cross-sectional shape of the shaft-shaped member 110.

A shaft-shaped member 120 shown in FIG. 22C is formed by placing four cylinders in a cross shape. A sheath-shaped member 122 is formed by an upper support frame 123 and a lower support frame 124 identical in cross-sectional shape, which has a shaft-shaped storage part 121 formed by a space having a shape corresponding to a cross-sectional shape of the shaft-shaped member 120. A shaft-shaped member 130 shown in FIG. 22D is formed by placing six cylinders in a regular hexagonal shape. A sheath-shaped member 132 is formed by an upper support frame 133 and a lower support frame 134, which has a shaft-shaped storage part 131 formed by a space having a shape corresponding to a cross-sectional shape of the shaft-shaped member 130.

Even when a shaft-shaped member and a sheath-shaped member have cross-sectional shapes as shown in FIGS. 22B, 22C, and 22D, the same effect as in the aforementioned example may be achieved and strength against torsion may be increased with an arm width reduced.

The sheath-shaped member 86 (112, 122, 132) forms a receiving member having a cylinder. The shaft-shaped member 82 forms a shaft slidably fitted in the cylinder.

FIGS. 23 to 27 are views describing a configuration and an action of the cheek pad 22. The cheek pad 22 is formed including a cheek plate 140, a support shaft 141, a lower support bracket 142, an upper support bracket 143, and a coil spring 144 showing a specific example of an elastic member.

Figure 23:
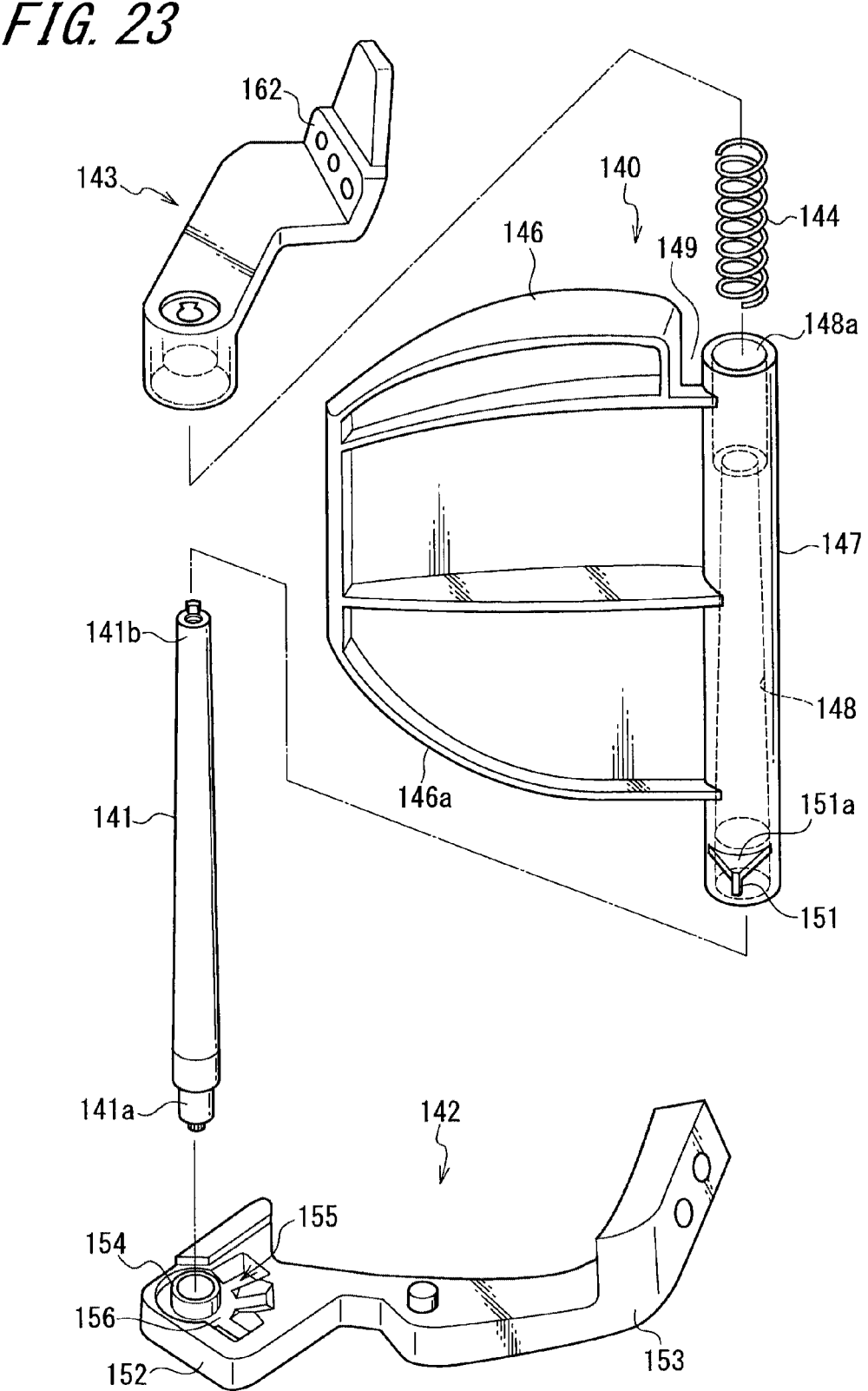
FIG. 23 is an exploded view describing a cheek pad of a video camera according to a first example of an imaging device according to an embodiment of the present invention.

As shown in FIG. 23, the cheek plate 140 is formed by a cheek rest 146, which is brought into contact with the cheek of the user during photographing, and a cylinder shaft 147 provided integrally with one side of the cheek rest 146. The cheek rest 146 is formed by a plate-shaped part having a projected curved surface, which is brought into contact with the cheek. A large arc-shaped chamfer 146a is provided on one corner of its lower part, so that the cheek rest 146 may be smoothly brought into contact with the cheek of the user. The cylinder shaft 147 is provided extending in an axial direction, along a side edge of the cheek part 146 opposite to the chamfer 146a. The cylinder shaft 147 has a through-hole 148 penetrating the axial center thereof.

Figure 24:
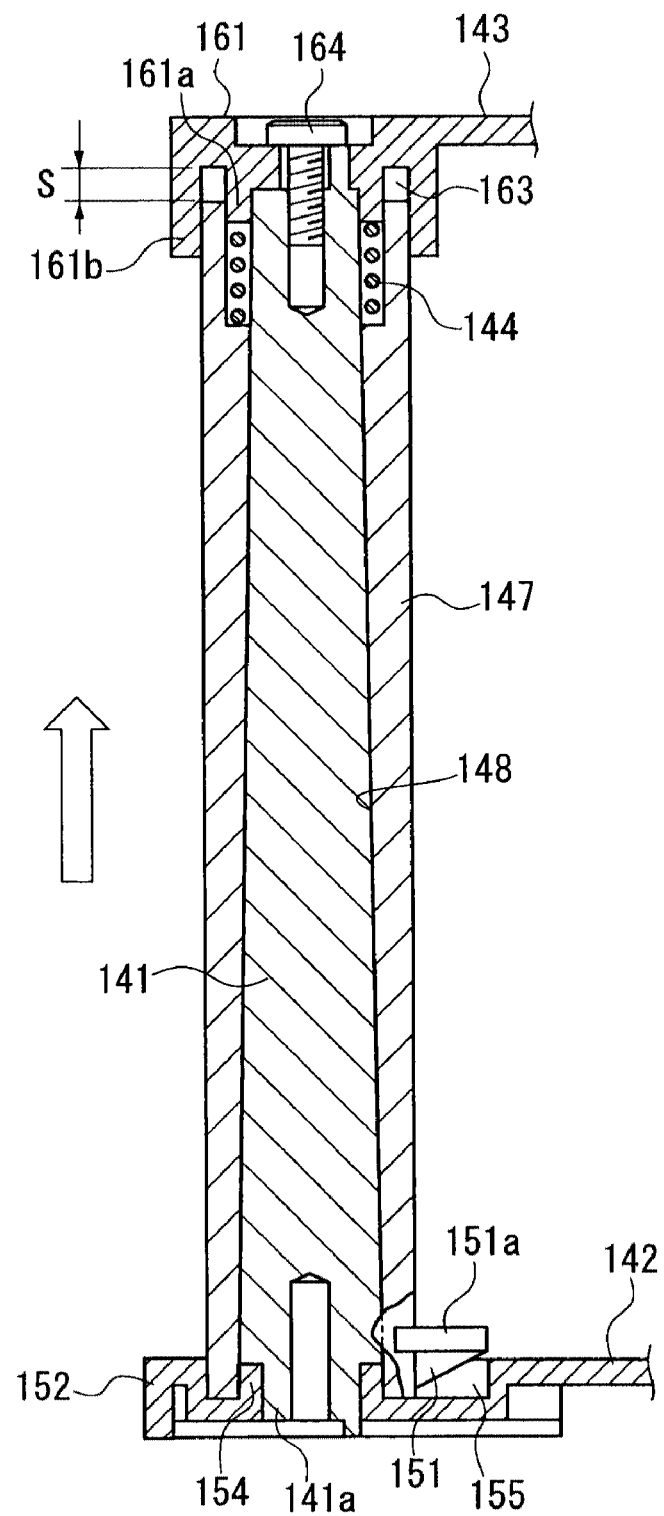
FIG. 24 is a cross-sectional view describing a support shaft of a cheek pad of a video camera according to a first example of an imaging device according to an embodiment of the present invention.

As shown in FIGS. 23 and 24, an upper edge of the cylinder shaft 147 is set lower than an upper edge of the cheek rest 146; however, a relief groove 149 is provided to allow rotation relative to the upper support bracket 143. Accordingly, the upper edge of the cylinder shaft 147 cylindrically protrudes upward at a height smaller than that of the cheek rest 146. A spring storage part 148a having an increased hole size is provided in an upper part of the through-hole 148 axially penetrating the cylinder shaft 147. The coil spring 144 is stored in the spring storage part 148a in a state of being compressed in an expansion and contraction direction, and the support shaft 141 penetrates inside the coil spring 144.

A stopper projection 151 protruding radially outward is provided on a lower outer circumference of the cylinder shaft 147. The stopper projection 151 is used for fixing the cheek rest 146 to a predetermined position, and is configured such that the cheek rest 146 may be selectively fixed to any of three positions in this example. The three fixing positions by the stopper projection 151 are set by the lower support bracket 142. A lower part of the stopper projection 151 is formed right triangular in a crosswise direction in order to allow the stopper projection 151 to be easily moved among three fixing places provided in the lower support bracket 142 for fixing the cheek rest 146 to respective fixing positions (described below). A circumferentially extending rib 151a is provided in an upper part of the stopper projection 151 to increase its strength.

As shown in FIGS. 23 and 24, the lower support bracket 142 is formed by: a shaft support 152 supporting a lower edge of each of the support shaft 141 and the cylinder shaft 147; and a fixing frame 153 fixing the shaft support 152 to the camera main body 2. An upper surface of the shaft support 152 has: a bearing shaft 154 which supports the support shaft 141 from below and in which its lower edge 141a is fitted; and a locking part 155 having three fixing places P1, P2, and P3 (FIG. 25). A ring-shaped slide receiving surface 156 is provided diametrically outside the bearing shaft 154 and is brought into slide contact with a lower edge surface of the cylinder shaft 147.

Figure 25A:
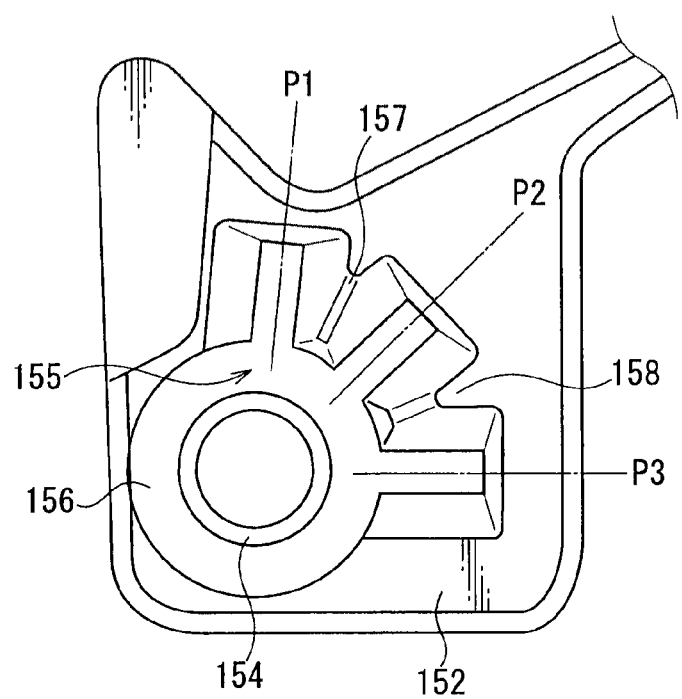
FIG. 25A is a plan view of a shaft support and FIG. 25B is a developed view of a locking part.
Figure 25B:
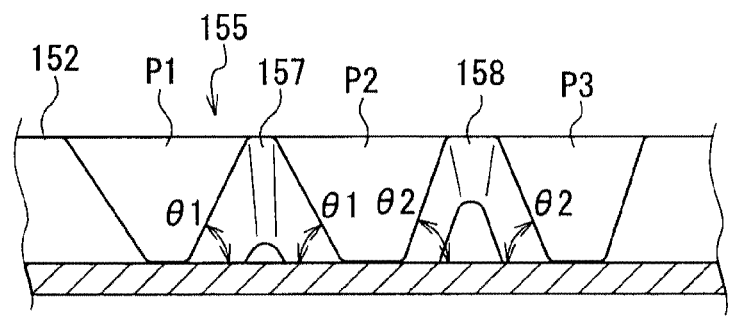

The locking part 155 of the lower support bracket 142 has a shape as shown in FIGS. 25A and 25B. FIG. 25A is a plan view of the locking part 155, and FIG. 25B is a front developed view of the locking part 155. The three fixing places P1, P2, and P3 of the locking part 155 are set having predetermined circumferential intervals with respect to the first fixing place P1. The first fixing place P1 of the locking part 155 is a place with which the stopper projection 151 is engaged when the cheek rest 146 is moved closest to the camera main body 2. Here, the cheek rest 146 has an attitude as indicated by a broken line in FIG. 27. The attitude of the cheek rest 146 here is an attitude when a small power battery is used for the power battery 20 and an outer circumference of the power battery 20 almost corresponds to that of the camera main body 2 (see FIG. 1).

The second fixing place P2 of the locking part 155 is a place with which the stopper projection 151 is engaged when the cheek rest 146 is moved appropriately remote from the camera main body 2. Here, the cheek rest 146 has an attitude as indicated by a chain double-dashed line in FIG. 27. The attitude of the cheek rest 146 here is an attitude when a large power battery is used for the power battery 20 and an outer circumference of the power battery 20 greatly protrudes rearward from the camera main body 2.

Further, the third fixing place P3 of the locking part 155 is a place with which the stopper projection 151 is engaged when the cheek rest 146 is completely withdrawn and moved most remote from the camera main body 2. Here, the cheek rest 146 has an attitude as indicated by a solid line in FIG. 27, where the cheek rest 146 is locked. The cheek rest 146 here has an attitude greatly protruding rearward from the back surface of the camera main body 2, and the cheek pad 22 is used in this attitude (see FIGS. 2 and 4).

As shown in FIGS. 25A and 25B, each of the three fixing places P1, P2, and P3 of the locking part 155 is formed as a groove having an inverted trapezoidal cross-section, and the stopper projection 151 may be moved between the adjacent fixing places. However, a first barrier 157 between the first fixing place P1 and the second fixing place P2 and a second barrier 158 between the second fixing place P2 and the third fixing place P3 are formed so that a force which may be necessary for overriding the first barrier 157 is different from a force which may be necessary for overriding the second barrier 158. The second barrier 158 is formed so as not to be overridden in a normal state.

Specifically, both walls of the first barrier 157 form rising angles θ1 set relatively small so that the stopper projection 151 may override the first barrier 157 even by a relatively small rotation force against a spring force of the coil spring 144. As a result, the stopper projection 151 may be relatively easily moved from the first fixing place P1 to the second fixing place P2 and from the second fixing place P2 to the first fixing place P1.

On the contrary, both walls of the second barrier 158 form rising angles θ2 set relatively large so that the stopper projection 151 may not override the second barrier 158 unless a relatively large rotation force is applied against a spring force of the coil spring 144. As a result, it may be necessary to apply a certain degree of force when the stopper projection 151 is moved from the second fixing place P2 to the third fixing place P3 and from the third fixing place P3 to the second fixing place P2. The time when the stopper projection 151 overrides the second barrier 158 and is fitted in the third fixing place P3 is a time when the cheek pad 22 is used. Therefore, in order to firmly fix the cheek rest 146 to the third fixing position P3 and strongly maintain an attitude of the video camera 1 in a photographing state, a large rising angle is set to prevent the stopper projection 151 from being easily removed.

The lower support bracket 142 having such a configuration is fixed to the camera main body 2 by screwing the fixing frame 153, which is attached to the back surface of the camera main body 2 by fitting. The upper support bracket 143 is placed above the support shaft 141 fitted in the shaft support 152 of the lower support bracket 142. The upper support bracket 143 is formed by: a bearing 161 fitted in an upper edge 141b of the support shaft 141 and an upper part of the cylinder shaft 147; and a fixing part 162 fixing the bearing 161 to the camera main body 2.

As shown in FIGS. 23 and 24, the bearing 161 of the upper support bracket 143 has: an inner cylinder 161a in which the upper edge 141b of the support shaft 141 is fitted; and an outer cylinder 161b concentrically provided radially outward of the inner cylinder 161a at a predetermined interval. One edge of the coil spring 144 in an expansion and contraction direction sits on an edge surface of the inner cylinder 161a. The upper edge of the cylinder shaft 147 enters a void 163 between the inner cylinder 161a and the outer cylinder 161b, and a predetermined space is set between a bottom surface of the void 163 and an upper edge surface of the cylinder shaft 147. Accordingly, the cheek rest 146 may be moved toward the upper support bracket 143 by a length S of the space against a spring force of the coil spring 144, as indicated by a chain double-dashed line in FIG. 26.

By moving the cheek rest 146 toward the upper support bracket 143 in this manner, the stopper projection 151 may be allowed to override the first barrier 157 or the second barrier 158. Here, a spring force of the coil spring 144 when overriding the second barrier 158 is larger than a spring force of the coil spring 144 when overriding the first barrier 157. Therefore, it is relatively easy to move the stopper projection 151 between the first fixing place P1 and the second fixing place P2; however, it is relatively difficult to move the stopper projection 151 between the second fixing place P2 and the third fixing place P3. The cheek rest 146 is firmly fixed to the third fixing place P3, making it possible to prevent rotation of the cheek rest 146 during use.

Figure 26:
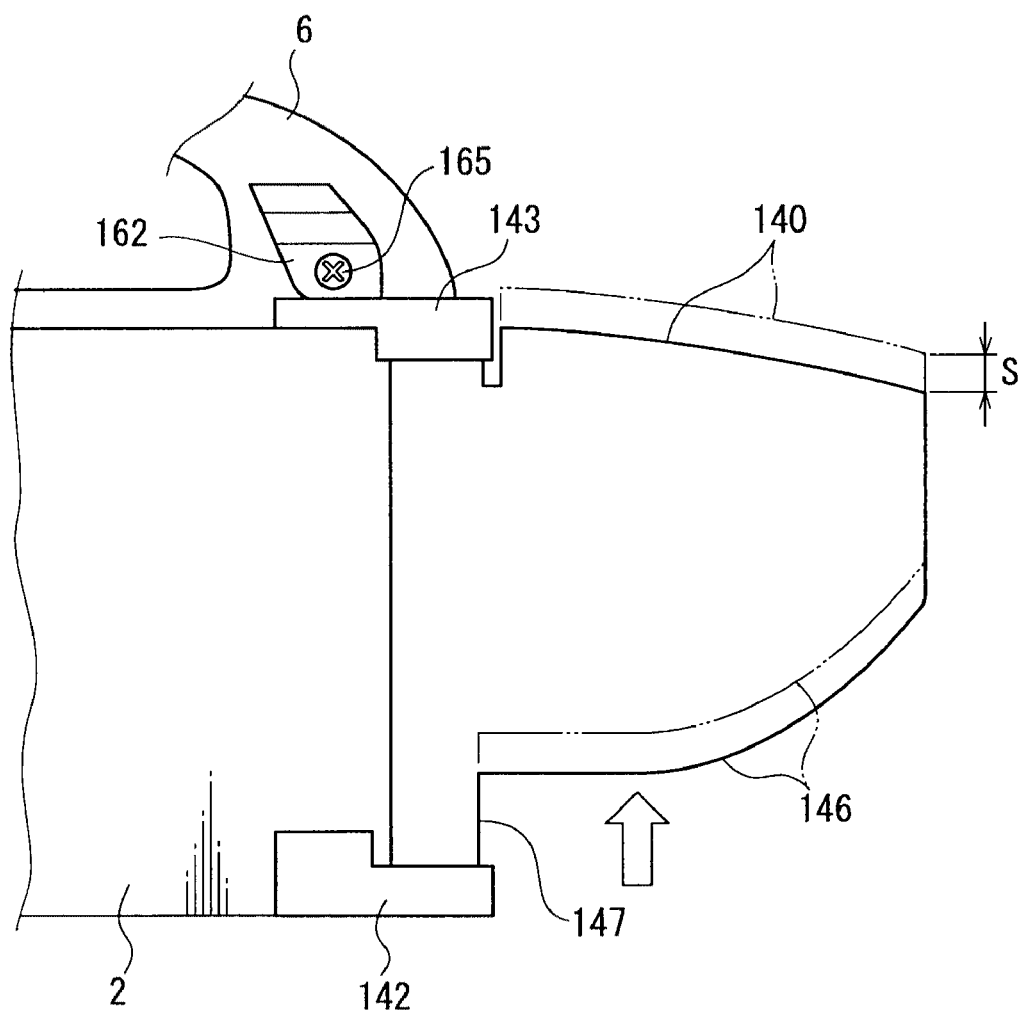
FIG. 26 is a view describing a state where a cheek plate of a cheek pad of a video camera according to a first example of an imaging device according to an embodiment of the present invention slides axially.
Figure 27:
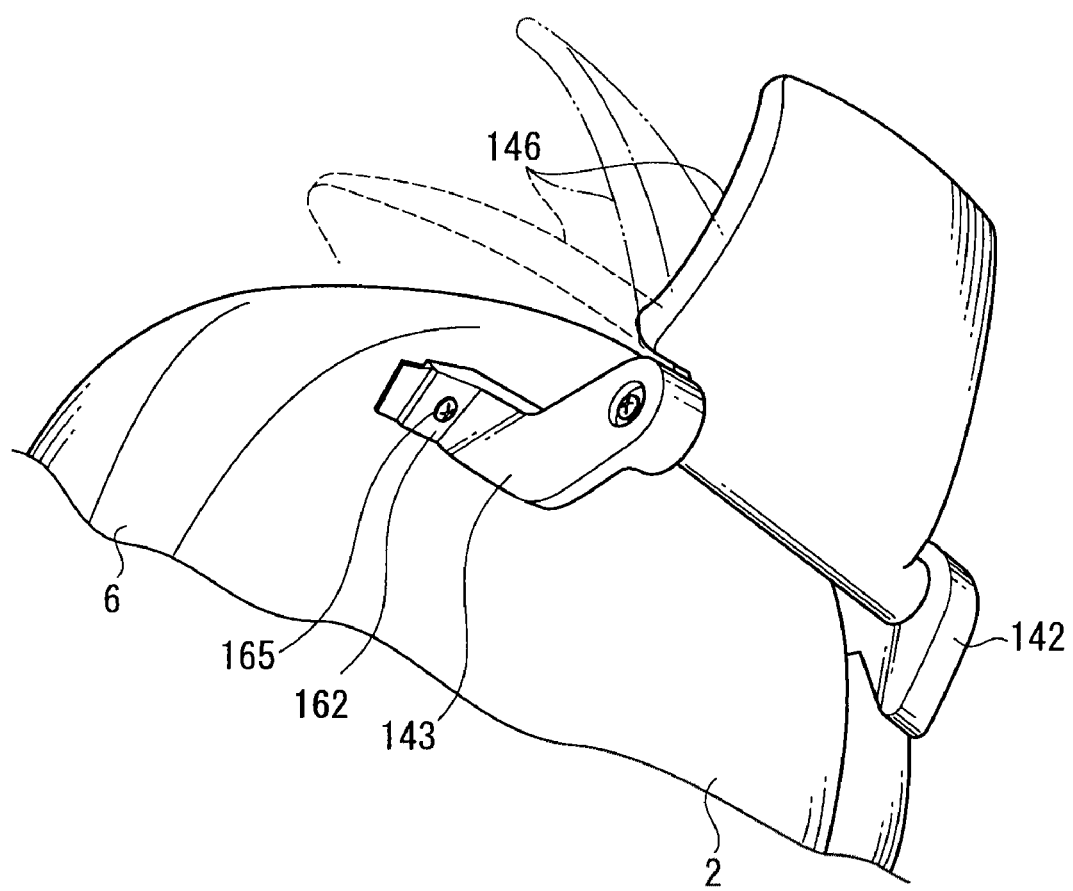
FIG. 27 is a view describing a state where a cheek plate of a cheek pad of a video camera according to a first example of an imaging device according to an embodiment of the present invention is opened and closed.

As shown in FIG. 24, an upper edge of the support shaft 141 is fastened and fixed to the bearing 161 of the upper support bracket 143 by a fixing screw 164. As shown in FIGS. 26 and 27, the fixing part 162 of the upper support bracket 143 is fastened and fixed to the handle 6 of the camera main body 2 by a fixing screw 165.

The video camera 1 having the aforementioned configuration is used by the user as shown in FIG. 2, for example.

According to an embodiment of the present invention, a slope is provided in the rear part of an imaging device main body, continuous from a bottom surface of the rear part, and an imaging device is supported by the slope as a shoulder rest, making it possible to suppress occurrence of image blur and to photograph a clear image. Since a shaft-shaped part adjusting a length of a shoulder pad is formed by a member having three or more protrusions integrally provided, it is possible to suppress generation of torsion by increasing the rigidity of the shaft-shaped part. Further, the shaft-shaped member is provided in the imaging device, so that the imaging device may be held more firmly and the shoulder pad may be freely adjusted to persons with various body shapes.

As described above, according to an embodiment of the present invention, a shoulder pad may be pushed against the breast or may be carried over the shoulder. Therefore, an imaging device may be surely maintained in a predetermined attitude and is highly easily portable. Moreover, photographing may be performed by an easy operation without necessity to take an uncomfortable posture.

The present invention is not limited to the embodiment described above and shown in the drawings, and various modifications may be effected without departing from the gist of the present invention.

The present application contains subject matter related to that disclosed in Japanese Priority Patent Application JP 2008-101974 filed in the Japan Patent Office on Apr. 9, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a main body including a front part and a rear part, a shape of the rear part of the main body including a slope that inclines upward from a horizontal bottom surface of the rear part, the slope being continuous with the bottom surface of the rear part;

a lens mounted to the front part of the main body;

a shoulder rest adjoined to the rear part of the main body, the shoulder rest including a first side and a second side, a shape of the first side being inclined so as to abut directly against the slope of the rear part of the main body in a first position; and a receiving member that is a sheath member fixed to the rear part of the main body, wherein the shoulder rest further includes
 a pad member, and
 a shaft that is slidably accommodated in the sheath member, and wherein a position of the pad member is adjustable by sliding the shaft within the sheath member.

2. The imaging device according to claim 1, wherein the second side of shoulder rest includes an abutting body configured to rest against a user.

3. The imaging device according to claim 2, wherein the shoulder rest further includes a hooking piece integrated with the abutting body, the hooking piece configured to be hooked over a shoulder of the user.

4. The imaging device according to claim 1, wherein the shaft has three or more protrusions provided integrally with the shaft, the protrusions extending in an axial direction of the shaft, and wherein the sheath member has a cross-section shape corresponding to a cross-section shape of the shaft.

5. The imaging device according to claim 1, wherein the shoulder rest is slidably extendable away from the rear part of the main body such that, in a second position, the shoulder rest does not abut the slope directly.

6. The imaging device according to claim 1, further comprising a cheek plate disposed at the rear part of the main body.

7. The imaging device according to claim 6, wherein the cheek plate is pivotally adjustable with respect to a side of the cheek plate.

8. The imaging device according to claim 1, wherein the shaft includes a lock groove that engages with a slide plate to maintain the shoulder rest in a fixed position with respect to the main body of the imaging device.

* * * * *